US012771645B2

(12) United States Patent
Matthews et al.

(10) Patent No.: US 12,771,645 B2
(45) Date of Patent: Oct. 20, 2026

(54) DELAY-BASED AUTOMATIC QUEUE MANAGEMENT AND TAIL DROP

(71) Applicant: Innovium, Inc., Santa Clara, CA (US)

(72) Inventors: William Brad Matthews, Los Gatos, CA (US); Bruce Hui Kwan, Santa Clara, CA (US); Puneet Agarwal, Santa Clara, CA (US)

(73) Assignee: Innovium, Inc., Santa Clara, CA (US)

( * ) Notice: Subject to any disclaimer, the term of this patent is extended or adjusted under 35 U.S.C. 154(b) by 422 days.

(21) Appl. No.: 18/378,522

(22) Filed: Oct. 10, 2023

(65) Prior Publication Data

US 2024/0039852 A1 Feb. 1, 2024

Related U.S. Application Data

(63) Continuation of application No. 17/091,916, filed on Nov. 6, 2020, now Pat. No. 11,784,932.

(51) Int. Cl.
*H04L 47/20* (2022.01)
*H04L 43/0852* (2022.01)
(Continued)

(52) U.S. Cl.
CPC .......... *H04L 47/20* (2013.01); *H04L 43/0858* (2013.01); *H04L 47/32* (2013.01); *H04L 47/568* (2013.01)

(58) Field of Classification Search
CPC ..... H04L 43/0858; H04L 47/20; H04L 47/32; H04L 47/568
See application file for complete search history.

(56) References Cited

U.S. PATENT DOCUMENTS 5,805,602 A 9/1998 Cloutier et al.
6,011,805 A 1/2000 Esteve et al.
(Continued)

FOREIGN PATENT DOCUMENTS

CN 111183624 A 5/2020

OTHER PUBLICATIONS

European Patent Office, Application No. 21890201.3, European Search Report dated Dec. 12, 2023.
(Continued)

*Primary Examiner* — Melanie Jagannathan
(74) *Attorney, Agent, or Firm* — Shield Intellectual Property PC; Kirk D. Wong

(57) ABSTRACT

Approaches, techniques, and mechanisms are disclosed for improving operations of a network switching device and/or network-at-large by utilizing queue delay as a basis for measuring congestion for the purposes of Automated Queue Management ("AQM") and/or other congestion-based policies. Queue delay is an exact or approximate measure of the amount of time a data unit waits at a network device as a consequence of queuing, such as the amount of time the data unit spends in an egress queue while the data unit is being buffered by a traffic manager. Queue delay may be used as a substitute for queue size in existing AQM, Weighted Random Early Detection ("WRED"), Tail Drop, Explicit Congestion Notification ("ECN"), reflection, and/or other congestion management or notification algorithms. Or, a congestion score calculated based on the queue delay and one or more other metrics, such as queue size, may be used as a substitute.

19 Claims, 12 Drawing Sheets

(51) Int. Cl.
*H04L 47/32* (2022.01)
*H04L 47/56* (2022.01)

(56) References Cited

U.S. PATENT DOCUMENTS 6,373,399 B1 4/2002 Johnson et al.
6,625,151 B1 9/2003 Alowersson et al.
6,650,621 B1 11/2003 Maki-Kullas
6,721,316 B1 4/2004 Epps et al.
6,865,160 B1 3/2005 Bare
6,977,930 B1 12/2005 Epps et al.
7,149,187 B1 12/2006 Jacobson et al.
7,295,562 B1 11/2007 Acharya et al.
7,360,217 B2 4/2008 Melvin et al.
7,382,244 B1 6/2008 Donovan et al.
7,813,348 B1 10/2010 Gupta et al.
7,898,959 B1 3/2011 Arad
8,004,990 B1 8/2011 Callon
8,281,033 B1 10/2012 Riordan et al.
8,588,242 B1 11/2013 Izenberg et al.
8,797,877 B1* 8/2014 Perla .................... H04L 49/90 370/252
9,489,401 B1 11/2016 Garcia et al.
9,565,114 B1 2/2017 Kabbani et al.
9,805,018 B1 10/2017 Richfield
9,979,624 B1 5/2018 Volpe et al.
10,063,488 B2 8/2018 Oran et al.
10,313,255 B1 6/2019 Matthews et al.
10,320,691 B1 6/2019 Matthews et al.
10,389,643 B1 8/2019 Matthews et al.
10,505,849 B1 12/2019 Iny et al.
10,673,770 B1 6/2020 Matthews et al.
10,713,079 B2 7/2020 Muramatti et al.
10,721,187 B1 7/2020 Goldman et al.
10,735,339 B1 8/2020 Matthews et al.
11,044,204 B1 6/2021 Matthews et al.
11,621,904 B1 4/2023 Matthews et al.
11,665,104 B1 5/2023 Matthews et al.
2002/0105908 A1* 8/2002 Blumer .................. H04L 47/30 370/230
2002/0133617 A1 9/2002 Davies
2003/0093567 A1 5/2003 Lolayekar et al.
2003/0131122 A1 7/2003 Kondo et al.
2003/0142685 A1 7/2003 Bare
2003/0152076 A1 8/2003 Lee et al.
2003/0154328 A1 8/2003 Henderson et al.
2003/0210695 A1 11/2003 Henrion
2003/0231594 A1* 12/2003 Xu .................... H04L 47/2433 370/236
2003/0231646 A1 12/2003 Chandra et al.
2004/0196790 A1* 10/2004 Balakrishnan .......... H04L 49/90 370/232
2004/0218925 A1 11/2004 Nahm
2004/0246976 A1* 12/2004 Balakrishnan ...... H04L 41/0896 370/395.41
2005/0007959 A1 1/2005 Tomonaga et al.
2005/0007961 A1 1/2005 Scott et al.
2005/0013248 A1 1/2005 Mekkittikul et al.
2005/0068970 A1 3/2005 Srikrishna et al.
2005/0086363 A1 4/2005 Ji
2005/0281279 A1 12/2005 Dennison et al.
2006/0036821 A1 2/2006 Frey et al.
2006/0067213 A1 3/2006 Evans et al.
2006/0117099 A1 6/2006 Mogul
2006/0218556 A1 9/2006 Nemirovsky et al.
2006/0274760 A1 12/2006 Loher
2007/0028003 A1 2/2007 Rudkin
2007/0058536 A1* 3/2007 Vaananen ............... H04L 47/12 370/230
2007/0091802 A1 4/2007 Pan et al.
2007/0195778 A1 8/2007 Tatar et al.
2007/0217336 A1* 9/2007 Sterne .................... H04L 47/30 370/235
2007/0280117 A1 12/2007 Katz et al.
2008/0112343 A1 5/2008 Oleszczuk
2008/0212613 A1 9/2008 Perkinson et al.
2008/0259800 A1 10/2008 Clark et al.
2009/0010248 A1 1/2009 Kanai
2009/0028045 A1 1/2009 Stellenberg et al.
2009/0063431 A1 3/2009 Erol et al.
2009/0075668 A1 3/2009 Rao
2009/0109858 A1 4/2009 Yamasaki et al.
2009/0190591 A1 7/2009 Sankaran
2009/0304014 A1 12/2009 Evans et al.
2010/0046524 A1 2/2010 Rune et al.
2010/0091782 A1 4/2010 Hiscock
2010/0309783 A1 12/2010 Howe
2011/0051602 A1 3/2011 Matthews et al.
2011/0122883 A1* 5/2011 Pacella ............... H04L 49/9042 370/412
2011/0205895 A1 8/2011 Chen et al.
2011/0255408 A1* 10/2011 Aybay ................. H04L 63/1458 370/235
2011/0280126 A1 11/2011 Fefer et al.
2012/0008496 A1 1/2012 Saavedra
2012/0063451 A1 3/2012 Keesara et al.
2012/0182870 A1* 7/2012 Francini .................. H04L 49/90 370/235
2012/0201241 A1 8/2012 Subramanian et al.
2012/0236860 A1 9/2012 Kompella et al.
2012/0254931 A1 10/2012 Oztaskent et al.
2013/0259037 A1 10/2013 Natarajan et al.
2013/0286834 A1* 10/2013 Lee ......................... H04L 47/60 370/235
2013/0329577 A1 12/2013 Suzuki et al.
2014/0092736 A1 4/2014 Baillargeon
2014/0105025 A1 4/2014 Lavian et al.
2014/0126396 A1 5/2014 Matthews et al.
2014/0126573 A1 5/2014 Matthews et al.
2014/0169189 A1 6/2014 Kalkunte
2014/0219087 A1 8/2014 Matthews et al.
2014/0247740 A1 9/2014 Koo
2014/0369426 A1 12/2014 Li et al.
2015/0016258 A1 1/2015 Okner et al.
2015/0016266 A1 1/2015 Dumitrescu et al.
2015/0016278 A1* 1/2015 Hayes ................. H04L 43/0864 370/249
2015/0043330 A1 2/2015 Hu et al.
2015/0124608 A1 5/2015 Agarwal et al.
2015/0139540 A1 5/2015 Moraleda et al.
2015/0295827 A1 10/2015 Zhu et al.
2016/0044695 A1 2/2016 Gunner
2016/0072717 A1 3/2016 Ansari et al.
2016/0087894 A1 3/2016 Chen et al.
2016/0134915 A1 5/2016 Oran
2016/0164792 A1 6/2016 Oran
2016/0241484 A1* 8/2016 De Schepper .......... H04L 47/32
2016/0254992 A1 9/2016 Torvi et al.
2016/0261500 A1 9/2016 Revah et al.
2016/0269284 A1 9/2016 Cheng et al.
2016/0294910 A1* 10/2016 Li .................... H04N 21/23439
2016/0308769 A1 10/2016 Versteeg et al.
2016/0373199 A1 12/2016 Olofsson et al.
2017/0048147 A1 2/2017 Vaidya
2017/0111264 A1 4/2017 Shankarappa et al.
2017/0126547 A1 5/2017 Wood et al.
2017/0134282 A1 5/2017 Agarwal et al.
2017/0149678 A1 5/2017 Dumitrescu et al.
2017/0279728 A1 9/2017 Oran
2017/0339074 A1 11/2017 Melman et al.
2018/0091388 A1 3/2018 Levy et al.
2018/0091431 A1* 3/2018 Burbridge ............... H04L 69/22
2018/0159800 A1 6/2018 Tietz et al.
2018/0302311 A1* 10/2018 Holness .................. H04L 43/04
2018/0356837 A1 12/2018 Lisewski et al.
2019/0089644 A1 3/2019 Shpiner et al.
2019/0199646 A1* 6/2019 Singh .................... H04W 72/12
2019/0230007 A1* 7/2019 Yousuf .................. H04L 43/022
2019/0379604 A1* 12/2019 Li ........................... H04L 47/29
2020/0007454 A1 1/2020 Frink
2020/0053026 A1 2/2020 Rangachari et al.
2020/0106710 A1 4/2020 Ryoo et al.
2020/0136973 A1 4/2020 Rahman et al.
2020/0228455 A1* 7/2020 Snowdon .............. H04L 43/106

(56) References Cited

U.S. PATENT DOCUMENTS

| | | | |
|---|---|---|---|
| 2020/0249979 | A1 | 8/2020 | Muramatti et al. |
| 2020/0274811 | A1 | 8/2020 | Srivastava et al. |
| 2021/0021545 | A1* | 1/2021 | Srivastava .............. H04L 47/32 |
| 2021/0112006 | A1* | 4/2021 | Francini ................ H04L 47/115 |
| 2021/0135996 | A1* | 5/2021 | Back ........................ H04L 47/54 |
| 2021/0243094 | A1 | 8/2021 | Holness et al. |
| 2021/0344600 | A1* | 11/2021 | Urman ..................... H04L 47/32 |
| 2021/0367898 | A1* | 11/2021 | Snowdon ............ H04L 43/0852 |
| 2021/0409313 | A1 | 12/2021 | Iorga et al. |
| 2022/0045972 | A1 | 2/2022 | Aibester et al. |
| 2022/0150171 | A1 | 5/2022 | Matthews et al. |

OTHER PUBLICATIONS

Sinha et al. "Harnessing TCP's Burstiness with Flowlet Switching." (2004).
U.S. Appl. No. 15/407,149, Non-Final Office Action dated Aug. 28, 2018.
U.S. Appl. No. 15/407,149, Notice of Allowance dated Jan. 25, 2019.
U.S. Appl. No. 15/407,156, Notice of Allowance dated Jan. 24, 2019.
U.S. Appl. No. 15/407,159, Advisory Action dated Nov. 1, 2019.
U.S. Appl. No. 15/407,159, Final Office Action dated Aug. 13, 2019.
U.S. Appl. No. 15/407,159, Non-Final Office Action dated Jan. 4, 2019.
U.S. Appl. No. 15/407,159, Notice of Allowance dated Mar. 25, 2020.
U.S. Appl. No. 15/410,607, Final Office Action dated Dec. 18, 2018.
U.S. Appl. No. 15/410,607, Non-Final Office Action dated May 17, 2018.
U.S. Appl. No. 15/410,607, Notice of Allowance dated Apr. 3, 2019.
U.S. Appl. No. 15/410,644, Final Office Action dated Oct. 11, 2018.
U.S. Appl. No. 15/410,644, Non-Final Office Action dated May 3, 2018.
U.S. Appl. No. 15/410,644, Notice of Allowance dated Jan. 28, 2019.
U.S. Appl. No. 15/410,651, Final Office Action dated Oct. 11, 2018.
U.S. Appl. No. 15/410,651, Final Office Action dated Jun. 6, 2019.
U.S. Appl. No. 15/410,651, Non-Final Office Action dated May 15, 2018.
U.S. Appl. No. 15/410,651, Non-Final Office Action dated Feb. 15, 2019.
U.S. Appl. No. 15/410,651, Notice of Allowance dated Sep. 25, 2019.
U.S. Appl. No. 15/410,686, Final Office Action dated Nov. 8, 2018.
U.S. Appl. No. 15/410,686, Non-Final Office Action dated May 9, 2018.
U.S. Appl. No. 15/410,686, Notice Of Allowance dated Apr. 9, 2019.
U.S. Appl. No. 15/446,888, Advisory Action dated Mar. 15, 2019.
U.S. Appl. No. 15/446,888, Final Office Action dated Nov. 23, 2018.
U.S. Appl. No. 15/446,888, Non-Final Office Action dated May 10, 2018.
U.S. Appl. No. 15/446,888, Notice of Allowance dated Sep. 24, 2019.
U.S. Appl. No. 15/446,894, Non-Final Office Action dated Jul. 27, 2018.
U.S. Appl. No. 15/446,894, Notice of Allowance dated Feb. 19, 2019.
U.S. Appl. No. 15/446,901, Advisory Action dated Mar. 28, 2019.
U.S. Appl. No. 15/446,901, Final Office Action dated Jan. 15, 2019.
U.S. Appl. No. 15/446,901, Non-Final Office Action dated Aug. 29, 2018.
U.S. Appl. No. 15/446,901, Notice of Allowance dated May 28, 2019.
U.S. Appl. No. 16/288,165, Non-Final Office Action dated Aug. 22, 2019.
U.S. Appl. No. 16/288,165, Notice of Allowance dated Jan. 27, 2020.
U.S. Appl. No. 16/527,278, Non-Final Office Action dated Oct. 13, 2020.
U.S. Appl. No. 16/527,278, Notice of Allowance dated Feb. 19, 2021.
U.S. Appl. No. 16/575,343, Advisory Action dated Jun. 29, 2021.
U.S. Appl. No. 16/575,343, Advisory Action dated Jul. 25, 2022.
U.S. Appl. No. 16/575,343, Final Office Action dated Mar. 31, 2021.
U.S. Appl. No. 16/575,343, Final Office Action dated May 10, 2022.
U.S. Appl. No. 16/575,343, Non-Final Office Action dated Sep. 30, 2020.
U.S. Appl. No. 16/575,343, Non-Final Office Action dated Sep. 28, 2021.
U.S. Appl. No. 16/575,343, Non-Final Office Action dated Sep. 6, 2022.
U.S. Appl. No. 16/575,343, Notice of Allowance dated Jan. 11, 2023.
U.S. Appl. No. 16/595,127, Non-Final Office Action dated Oct. 16, 2020.
U.S. Appl. No. 16/595,127, Notice of Allowance dated Mar. 23, 2021.
U.S. Appl. No. 16/741,510, Notice of Allowance dated Feb. 18, 2021.
World Intellectual Property Organization, Application No. PCT/US22/20087, International Search Report dated Jul. 19, 2022.
U.S. Appl. No. 17/091,904, Non-Final Office Action dated Apr. 28, 2022.
U.S. Appl. No. 17/091,904, Notice of Allowance dated Nov. 17, 2022.
U.S. Appl. No. 17/091,916, Non-Final Office Action dated Mar. 15, 2023.
U.S. Appl. No. 17/091,916, Notice of Allowance dated May 26, 2023.
U.S. Appl. No. 17/091,916, Restriction Requirement dated Sep. 22, 2022.
U.S. Appl. No. 17/352,583, Final Office Action dated May 15, 2023.
U.S. Appl. No. 17/352,583, Non-Final Office Action dated Dec. 22, 2022.
U.S. Appl. No. 17/352,583, Notice of Allowance dated Aug. 9, 2023.
U.S. Appl. No. 17/367,330, Notice of Allowance dated Mar. 24, 2023.
U.S. Appl. No. 17/385,503, Non-Final Office Action dated Apr. 7, 2023.
U.S. Appl. No. 17/385,503, Notice of Allowance dated Aug. 10, 2023.
U.S. Appl. No. 18/108,546, Non-Final Office Action dated Jun. 23, 2023.
U.S. Appl. No. 18/108,546, Notice of Allowance dated Nov. 14, 2023.
Chinese Patent Office, Application No. 202180089206.4, Office Action dated Jan. 26, 2024.
U.S. Appl. No. 18/141,276, Notice of Allowance dated Dec. 20, 2023.

* cited by examiner

DELAY-BASED AUTOMATIC QUEUE MANAGEMENT AND TAIL DROP

PRIORITY CLAIM

This application claims benefit under 35 U.S.C. § 120 as a Continuation of U.S. application Ser. No. 17/091,916, filed Nov. 6, 2020, the entire contents of which is hereby incorporated by reference as if fully set forth herein.

RELATED CASES

This application is related to: U.S. patent application Ser. No. 15/407,149, filed on Jan. 16, 2017, entitled "Intelligent Packet Queues with Delay-Based Actions," by Brad Matthews, et al.; U.S. patent application Ser. No. 15/407,159, filed on Jan. 16, 2017, entitled "Intelligent Packet Queues With Efficient Delay Tracking," by Brad Matthews, et al.; U.S. patent application Ser. No. 16/288,165, filed on Feb. 28, 2019, entitled "Intelligent Packet Queues With Delay-Based Actions," by Brad Matthews, et al.; and U.S. patent application Ser. No. 16/575,343, filed on Sep. 18, 2019, entitled "Delay-Based Tagging In A Network Switch," by Brad Matthews, et al., the entire contents of each of which are hereby incorporated by reference for all purposes as if fully set forth herein.

TECHNICAL FIELD

Embodiments relate generally to computer networking, and, more specifically, to techniques for delay-based handling of data units within a network device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network is a set of computing components interconnected by communication links. Each computing component may be a separate computing device, such as, without limitation, a hub, switch, bridge, router, server, gateway, or personal computer, or a component thereof. Each computing component, or "network device," is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), with multiple data units at one layer typically combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different paths through the network that lead to the other node, each path including any number of intermediate nodes. The sending and receiving nodes may be referred to as "endpoints." The transmission of data across a computing network typically involves sending units of data, such as packets, cells, or frames, along paths through intermediary networking devices, such as switches or routers, that direct or redirect each data unit towards a corresponding destination.

While a data unit is passing through an intermediary networking device—a period of time that is conceptualized as a "visit" or "hop"—the device may perform any of a variety of actions, or processing steps, with the data unit. The exact set of actions taken will depend on a variety of characteristics of the data unit, such as metadata found in the header of the data unit, and in many cases the context or state of the network device. For example, address information specified by or otherwise associated with the data unit, such as a source address, a destination address, or path information, is typically used to determine how to handle a data unit (e.g. what actions to take with respect to the data unit). For instance, an Internet Protocol ("IP") data packet may include a destination IP address field within the header of the IP data packet, based upon which a network device may determine one or more other networking devices, among a number of possible other networking devices, to forward the IP data packet to. The logic within a network device that controls the specific set of actions performed with respect to a given data unit is often referred to as "packet-switching" logic.

A network device may include any number of internal hardware and/or software components configured to handle the movement of data units between processing components within the device and, eventually, out of the device. It is desirable for these components to quickly determine where to send and/or store data for processing, and to expediently send and/or store that data to the appropriate destination once determined. Moreover, it is desirable for these components to handle network traffic in a manner that will optimally utilize available network resources throughout the network in which the device is situated.

For these and other reasons, a network switch or other device may implement various policies that control whether the device forwards a data unit to its intended destination in a normal manner, or performs some special action on the data unit. For example, such a policy may indicate that certain data units should be "dropped" or "discarded" to reduce the likelihood of future congestion at the network device or within the network at large. As another example, such a policy may indicate to mark the data unit in a particular manner instead of dropping the data unit.

Some such policies are known as "Tail Drop" policies. Conventional Tail Drop policies indicate to a network device's packet-switching logic that, when the queue in which a data unit would be enqueued is larger than a maximum size, the packet-switching logic must discard the data unit rather than enqueueing the data unit for processing. The dropping of data units under these and other policies are expected in protocols such as Transmission Control Protocol ("TCP"), which include mechanisms, such as sequence numbers, that allow endpoints to detect when a packet has been dropped and request retransmission. Endpoints observing dropped data units may optionally take actions to reduce the congestion, such as reducing a transmission rate.

Another class of such policies is known as Active Queue Management ("AQM"). Conventional AQM policies indicate to the packet-switching logic to drop or mark data units before the conditions that would result in Tail Drop actually occur (e.g. before a queue reaches the maximum size for the queue), but only for a subset of the data units. For example, an AQM policy may involve selecting a certain percentage of data units to drop, or dropping data units at a certain frequency. The policy might probabilistically select the subset by comparing a randomly generated number to a corresponding threshold to determine which specific data units are dropped to reach this percentage. Or, the policy might utilize a corresponding pattern to determine which specific data units are dropped to reach this percentage. Some AQM policies may use algorithms such as Weighted Random Early Detection ("WRED") to adjust this percentage as the queue size increases.

AQM and other policies may be combined with congestion notification logic, such as Explicit Congestion Notification ("ECN") to notify endpoints that a certain level of congestion exists within the intermediate network device (e.g. by marking data units with a congestion notification label). An endpoint may be configured to, upon receiving a notification of congestion from an intermediate switching device, throttle back transmission rates into the network, modify load-balancing decisions, relay the notification to the other endpoint with which it is communicating, and/or take other appropriate actions. The endpoint may take these actions for all network traffic for a period of time (e.g. until receiving notification that the congestion has fallen back to an acceptable level), or specifically for a flow of traffic associated with the notification.

Another example of congestion notification logic is Quantized Congestion Notification ("QCN"). QCN utilizes indications from network switch elements to report congestion measures (e.g. as a set of bits inserted into a data unit header). Endpoints may utilize the measures to determine when to perform actions such as mentioned above.

Yet another example of notification logic involves reflected data units. A switching device may return a data unit (or copy thereof) back to its sender, with a congestion indicator such as a current congestion measure or quantized congestion value inserted therein. Data units may be reflected periodically, or data units may be selected for reflection in the same manner that data units are selected for dropping or tagging under AQM policies. Hence, the reporting of congestion via data unit reflection may occur only during period of congestion, and the reporting occurs more frequently when congestion is higher.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
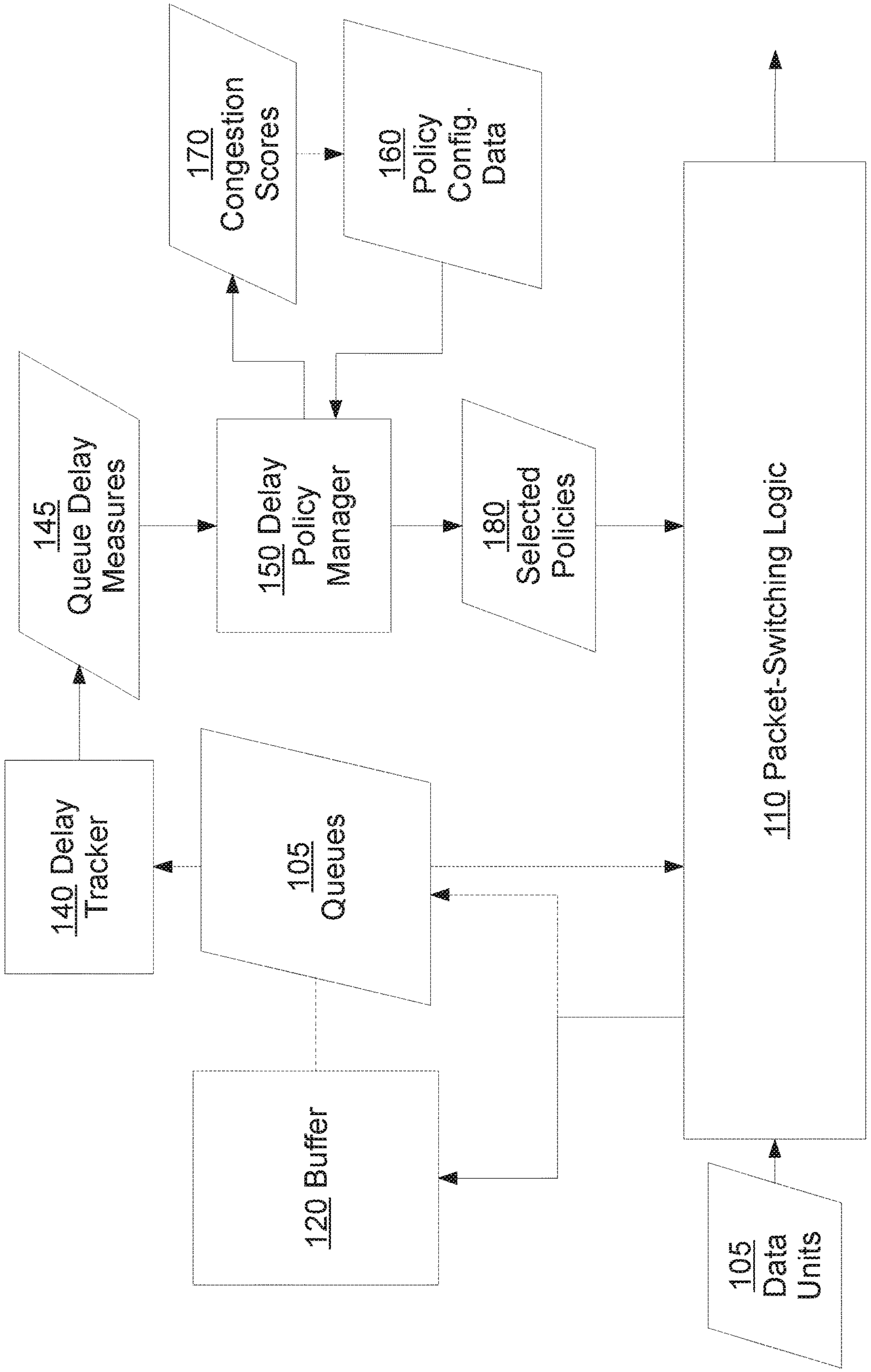
FIG. 1 is an illustrative view of various components of an example system configured for implementing congestion management and/or notification policies based on queue delay.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter. Embodiments are described herein according to the following outline:

1.0. General Overview
2.0. System Overview
  2.1. Packet-Switching Logic
  2.2. Queues
  2.3. Delay Tracking
  2.4. Delay-Based Policies
  2.5. Miscellaneous
3.0. Functional Overview
  3.1. Processing a Data Unit with Queue Delay tracking
  3.2. Calculating Queue Delay
  3.3. Applying Delay-Based Policies
  3.4. Example Delay-Based Policies and Actions
  3.5. Composite Scoring 3.6. Telemetry Extensions to Congestion Notification Marking
4.0. Example Implementing Systems
4.1. Networks
4.2. Data Units
4.3. Network Paths
4.4. Network Device
4.5. Ports
4.6. Packet Processors
4.7. Buffers
4.8. Queues
4.9. Traffic Management
4.10. Forwarding Logic
4.11. Miscellaneous
5.0. Example Embodiments
6.0. Implementation Mechanism—Hardware Overview
7.0. Extensions and Alternatives

1.0. GENERAL OVERVIEW

Approaches, techniques, and mechanisms are disclosed for improving operations of a network switching device and/or network-at-large by utilizing queue delay as a basis for measuring congestion for the purposes of AQM and/or other congestion-based policies. Queue delay is an exact or approximate measure of the amount of time a data unit waits at a network device as a consequence of queuing, such as the amount of time the data unit spends in an egress queue while the data unit is being buffered by a traffic manager.

Any suitable technique for tracking queue delay may be managed, such as calculating the difference between arrival and departure timestamps for each data unit, or tracking how long a marker data unit has been within a queue. The queue delay associated with a queue may be an instantaneous measure of the amount of time a certain data unit—typically the most recently dequeued data unit, the data unit at the head of the queue, or a marker data unit—was or has been within the queue. Queue delay may instead be an average of such measures over time. In an embodiment, an exponentially weighted moving average may be used.

Queue delay may be used as a substitute for queue size in existing AQM, WRED, Tail Drop, ECN, reflection, and/or other congestion management or notification algorithms. For example, a network device may be configured to implement a policy to drop data units destined for a queue once the queue delay associated with that queue reaches a certain threshold. Or, as another example, a network device may implement a WRED algorithm in which the percentage thresholds are based on queue delay instead of queue size.

In yet other embodiments, queue delay may be one of several factors used in congestion management or notification algorithms. A composite congestion score may be determined based on queue delay and one or more other metrics, such as queue size or flow rate. Determinations as to which congestion management or notification policies to implement may be based on the composite congestion score. For instance, a higher composite congestion score may result in a higher probability that an AQM action will be performed than a lower composite congestion score.

In an embodiment, a network device may insert values for queue delay and/or one or more other congestion-related metrics when marking data units in accordance with delay-based AQM, tail drop, or other congestion management or notification algorithms.

In other aspects, the inventive subject matter encompasses computer apparatuses and computer-readable media configured to carry out the foregoing techniques.

2.0. SYSTEM OVERVIEW

FIG. 1 is an illustrative view of various components of an example system 100 configured for implementing congestion management and/or notification policies based on queue delay, according to an embodiment. In an embodiment, the various components of system 100 described below are hardware-based logic units within an application-specific integrated circuits (ASICs), field programmable gate arrays (FPGAs), or other integrated circuit(s). In other embodiments, some or all of the components may be software-based logic implemented by one or more processors executing instructions stored in one or more computer-readable media.

2.1. Packet-Switching Logic

System 100 is generally configured to forward data units 105 to various destinations. The data units 105 are received from an undepicted upstream device component, such as one or more ingress ports, communication interfaces, and/or interconnects. The destinations may be egress ports, communication interfaces, or internal device components, also undepicted. The data units 105 may be any suitable type of data unit. In an embodiment, the data units are packets, though each packet may be received and processed as a set of subunits (e.g. cells or frames) over time.

System 100 includes packet-switching logic 110. Packet-switching logic 110 may include logic implemented by a variety of components within a networking device, such as one or more traffic managers and/or one or more packet processors.

Packet-switching logic 110 generally determines how to handle incoming data units 105 received via, for instance, ingress ports. For each data unit 105, this may involve a number of decisions, including determining where to send the data unit 105 (e.g. which egress port(s), internal processing components, etc.), when to release the data unit 105 to those destination(s) (e.g. from egress buffers maintained by a traffic manager or other component), whether to manipulate the data unit 105 (e.g. tagging or marking by a traffic manager or other component), and/or whether to drop the data unit 105 instead of sending the data unit 105. Packet-switching logic 110 may be directly connected to the possible destinations, such as egress ports, to which a data unit 105 may be forwarded, or packet-switching logic 110 may generate forwarding instruction(s) to a downstream component to send the data unit 105 to the destination(s).

Data units 105 may be placed in a buffer memory, referred to as buffer 120, while awaiting processing by the packet-switching logic 110 (e.g. by egress forwarding logic of the packet-switching logic 110). The data units 105 may be stored in any suitable fashion, including, without limitation, as a set of constituent subunits spread out across multiple buffer entries, each linked together by suitable linking data. The buffer 120 may be any suitable type of memory, such as static random access memory ("SRAM").

2.2. Queues

Packet-switching logic 110 may include queueing logic maintained by a traffic manager or other component that manages the order in which data units 105 are processed by the packet-switching logic 110 (e.g. on egress from the traffic manager). The queueing logic may place each buffered data unit 105 in a queue 130. A queue 130 is an ordered list used to manage the order in which the data units 150 will be processed. The first entry, or start of the queue, is known as the "head" of the queue 130, while the last entry, or end of the queue 130, is known as the "tail." In most embodiments, upon first being placed in a queue 130, a data unit 105 is placed, or "enqueued," at the tail of the queue. The data unit 105 gradually moves to the head of the queue 130 as other data units 105 exit the queue 130. In most embodiments, data units 105 are typically removed from the queue 130 for processing, or "dequeued," only when at the head of the queue 130.

A queue 130 may be represented using any suitable structure, such as a linked list, array, etc. A queue 130 typically points to, rather than stores, the data units said to be "in" the queue 130. For instance, each node, or entry, in the queue 130 may be stored as a reference to the buffer entry in which the corresponding data unit 105 (or start thereof) is stored, though queues 130 may take other forms. The size of a queue 130 is typically the number of data units 105 currently within the queue 130, though in some embodiments the size may be expressed in other terms, such as a total amount of data within the queue 130, a number of subunits within the queue 130, and so forth.

The queueing logic may manage any number of queues 130, with different queues 130 having different purposes. For instance there may different sets of queues 130 for different processing stages (e.g. ingress versus egress), different sources and/or destinations (e.g. ports, port groups, processing blocks, etc.), different types or classes of data units 105, different traffic flows or groups of flows, and so forth.

At any given time, packet-switching logic 110 uses queues 130 to decide which data unit 105 to process next. For instance, packet-switching logic 110 may be configured to process one data unit 105 from each queue 110 in each execution cycle. As another example, packet-switching logic 110 may be capable of processing data units from only a limited number of queues 130 in each execution cycle, and include scheduling and/or prioritization logic to determine from which queue(s) 130 to dequeue a data unit in a given execution cycle. In some embodiments, the rate at which data associated with a queue 130 is sent from a device may be controlled by how frequently the packet-switching logic 110 processes the queue 130 relative to other queues 130.

2.3. Delay Tracking

System 100 further comprises delay tracking logic 140, also known as a "delay tracker." Delay tracking logic 140 is configured to compute delay measures 145 associated with the queues 130. In general, the delay measure 145 of a queue 130 approximates the amount of delay a data unit 105 experiences as a result of waiting in that queue 130. The delay may reflect that experienced by the most recently dequeued data unit 105, a designated marker data unit 105, or a group of the most recently dequeued data units 105, depending on the embodiment.

Delay measures 145 may be calculated in a variety of manners based on a variety of factors, depending on the embodiment. In most cases, delay tracking logic 140 stores arrival timestamp values for one or more data units 105 within the queue 130. The arrival timestamp may be recorded at different times in different embodiments, such as when the associated data unit 105 was enqueued, arrived at the packet-switching logic 110, arrived at a traffic manager within the packet-switching logic 110, was received an at ingress block, or any other suitable time.

In an embodiment, an arrival timestamp is kept for each data unit 105 in a queue 130. The delay tracking logic 140 may then calculate the delay of the queue 130 each time a data unit 105 is dequeued, as a function of the difference between the time the data unit 105 is finally dequeued and the arrival time of the data unit 105.

In an embodiment, arrival timestamps are kept for only certain data units 105 in a queue 130, referred to as marker data units 105. The delay measure 145 for a queue 130 is the difference between the time that a data unit 105 was most recently dequeued and the arrival timestamp of the marker data unit 105 that is closest to the head of the queue 130 (which will thus be the oldest arrival timestamp still recorded for any data unit in the queue). In this embodiment, the delay measure 145 is thus, in most cases, an approximate measure. Examples of marker-based techniques are described in, without limitation, the afore-mentioned application, "Intelligent Packet Queues With Efficient Delay Tracking."

In an embodiment, the delay of a queue 130 may be updated at times other than when a data unit 105 is being dequeued. For example, the delay may be calculated before enqueueing a data unit 105, so as to determine whether to perform one or more actions on ingress of the data unit 105, or at periodic or other intervals as part of a background process. At such times, the delay measure may be, for instance, calculated as a function of the difference between the current system time and the arrival time of the data unit 105 at the head of the queue 130, or the arrival time of the marker data unit 105 closest to the head of the queue 130.

In an embodiment, the delay of a queue 130 may be an average of multiple instantaneous measures, such as the delay of the last five data units to depart from the queue 130. Or, a moving average may be used, as described in other sections. Of course, other formulas may be used to calculate an average as well.

2.4. Delay-Based Policies

System 100 further comprises delay-based policy management logic 150, also known as a "policy manager," which is either a subcomponent of the packet-switching logic 110 (e.g. within a traffic manager or other suitable subcomponent), or a separate system component. Delay-based policy manager 150 uses the delay measures computed by delay tracking logic 140 to determine when to apply particular policies 180 to particular queues 130 and/or specific data units 105 from those queues 130. The policies 180 that may be applied vary from embodiment to embodiment, but in many embodiments include policies to drop and/or mark a data unit 105 at a certain rate.

The particular policy or policies 180 to apply may be selected at least in part using policy configuration data 160. The delay-based policy manager 150 is configured to compare a congestion score 170 for a queue 130 to a score-to-policy mapping in the policy configuration data 160 to identify a specific policy 180 for the packet-switching logic 110 to apply to data units 105 as they enter or leave the queue 130.

In some embodiments, the congestion score 170 may simply be the delay measure 145 for the queue 130. In other embodiments, the delay-based policy manager 150 computes the congestion score 170 for a queue 130 based on the delay measure 145, such as by using a function, lookup table, or other mechanism.

In an embodiment, the function, lookup table, or other mechanism may also be based on other metrics. These other metrics may include queue-related metrics, including without limitation queue size, queue velocity (a rate of change in the delay measure 145 and/or queue size), or queue acceleration (a rate in change of velocity). These metrics may also include flow-related metrics, such as a number of flows (average, actual, or estimated) currently associated with the queue 130, or associated with the same ingress port or egress port as the data unit to which a policy 180 will be applied. In an embodiment, the flow-related metrics may further include a flow rate (average or fixed value) that is expected or actually observed for a traffic flow associated with the queue 130 and/or the data unit 105 to which a policy 180 is to be applied.

The score-to-policy mapping may take any suitable form, such as a table in which each row comprises a congestion score 170 or congestion score threshold, along with one or more policy identifiers. In the case of thresholds, a congestion score 170 is considered to be mapped to a policy 180 if it is in a range of scores indicated by the thresholds.

There may be various types of policies 180 to which a congestion score 170 may be mapped. Generally, a congestion score 170 will only indicate a single policy from a given policy type. For instance, there may be an ECN policy type. A small queue delay might result in a congestion score 170 within a range that is mapped to a first ECN policy that indicates to perform ECN-related marking a first percentage of the time, or not at all. A larger queue delay might result in a congestion score 170 within a range that is mapped to a second ECN policy 180 that indicates to perform ECN-related marking a second, higher percentage of the time. Yet a larger queue delay might result in a congestion score 170 within a range that is mapped to a third ECN policy 180 that indicates to perform ECN-related marking a third and yet higher percentage of the time.

Other example types of policies 180 may include, without limitation, tail drop policies (whether to enable queue tail drop), WRED policies (whether and/or how frequently to perform AQM-related dropping of data units), or reflection policies (whether and/or how frequently to reflect a data unit).

Depending on the embodiment, there may be any number of possible policies 180 for a given policy type. For instance, in an embodiment, the mapping mechanism may calculate the percentage of the time to perform AQM-related marking or dropping directly from the congestion score 170, meaning that there could be a virtually endless spectrum of AQM policies, each corresponding to a different percentage calculated by the function.

Policy configuration data 160 may include one or more score-to-policy mappings. A mapping may be specific to a queue 130, group of queues 130, or global. A queue 130 may have more than one mapping, each associated with a different type of policy 180 (e.g. a mapping for selecting a tail drop policy and a mapping for selecting an AQM policy). Moreover, in some embodiments, the policy manager 150 may compute different congestion scores 170 for different mappings.

The policy manager 150 returns information identifying the selected polic(ies) 180 for a given data unit 105 and/or queue 130 to the packet-switching logic 110. In some cases, depending on the embodiment, the policy manager 150 returns identifiers for the selected polic(ies) 180 to the packet-switching logic 110 directly in response to the packet-switching logic 110 requesting that the policy manager 150 indicate which polic(ies) 180 to apply to a specific queue 130 or data unit 105. In other cases, the policy manager 150 may write data identifying which polic(ies) 180 are currently associated with a queue 130 as queue metadata that the packet-switching logic 110 may read when it needs to determine which polic(ies) 180 to apply to a data unit 105 associated with the queue 130. In these cases, the policy manager 150 may be configured to identify which polic(ies) 180 to associate with a given queue 130 in response to certain triggers, such as the delay tracker 140 recalculating queue delay 145 for a queue 130, and/or periodically or at other intervals as part of a background process.

The packet-switching logic 110 is configured, in turn, to implement the selected polic(ies) 180 when enqueuing or dequeuing a data unit 105 to or from a queue 130, depending on the policy 180 and/or embodiment. For instance, the packet-switching logic 110 may compute a random number, compare that number to the threshold percentage indicated by the relevant policy to determine whether the associated action is to be performed, and then perform the indicated action (e.g. drop or mark the data unit 105) if necessary. The packet-switching logic 110 may continue to enqueue or dequeue the data unit 105 as normal if the indicated action does not preclude normal processing (e.g. forward the data unit 105 to its next hop if the data unit 105 was not dropped).

The exact component(s) of the packet-switching logic 110 that is responsible for implementing a given policy (and, as a consequence, the timing of such implementation), will depend upon the embodiment. For example, in an embodiment, the packet-switching logic 110 may include an ingress processor configured to determine which data units are eligible for various policy-based actions (and provide instructions indicating so to downstream logic), and an egress processor configured to apply perform the actual policy-based actions. As another example, in an embodiment, a traffic manager is configured to determine when to reflect a data unit 105, mark a data unit 105, drop a data unit 105, or apply other policies. The traffic manager may convey instructions to take the determined action(s) as control information to downstream logic, such as an egress packet processor. Of course, any other suitable arrangement of subcomponents may be utilized to apply delay-based policies.

2.5. Miscellaneous

System 100 illustrates only one of many possible arrangements of components in a network device configured to provide the functionality described herein. Other arrangements may include fewer, additional, or different components, and the division of work between the components may vary depending on the arrangement.

3.0. FUNCTIONAL OVERVIEW

This section includes example method flows for implementing various features of the systems and system components described herein. The example method flows are non-exhaustive. Alternative method flows and flows for implementing other features will be apparent from the disclosure.

The various techniques described below may be performed in a variety of systems, including without limitation in system 100, the switches described in other sections, and/or in other switching devices. In an embodiment, each of the processes described in connection with the functional blocks described below may be implemented using one or more integrated circuits, logic components, computer programs, other software elements, and/or digital logic in any of a general-purpose computer or a special-purpose computer, while performing data retrieval, transformation, and storage operations that involve interacting with and transforming the physical state of memory of the computer.

3.1. Processing a Data Unit with Queue Delay Tracking

Figure 2:
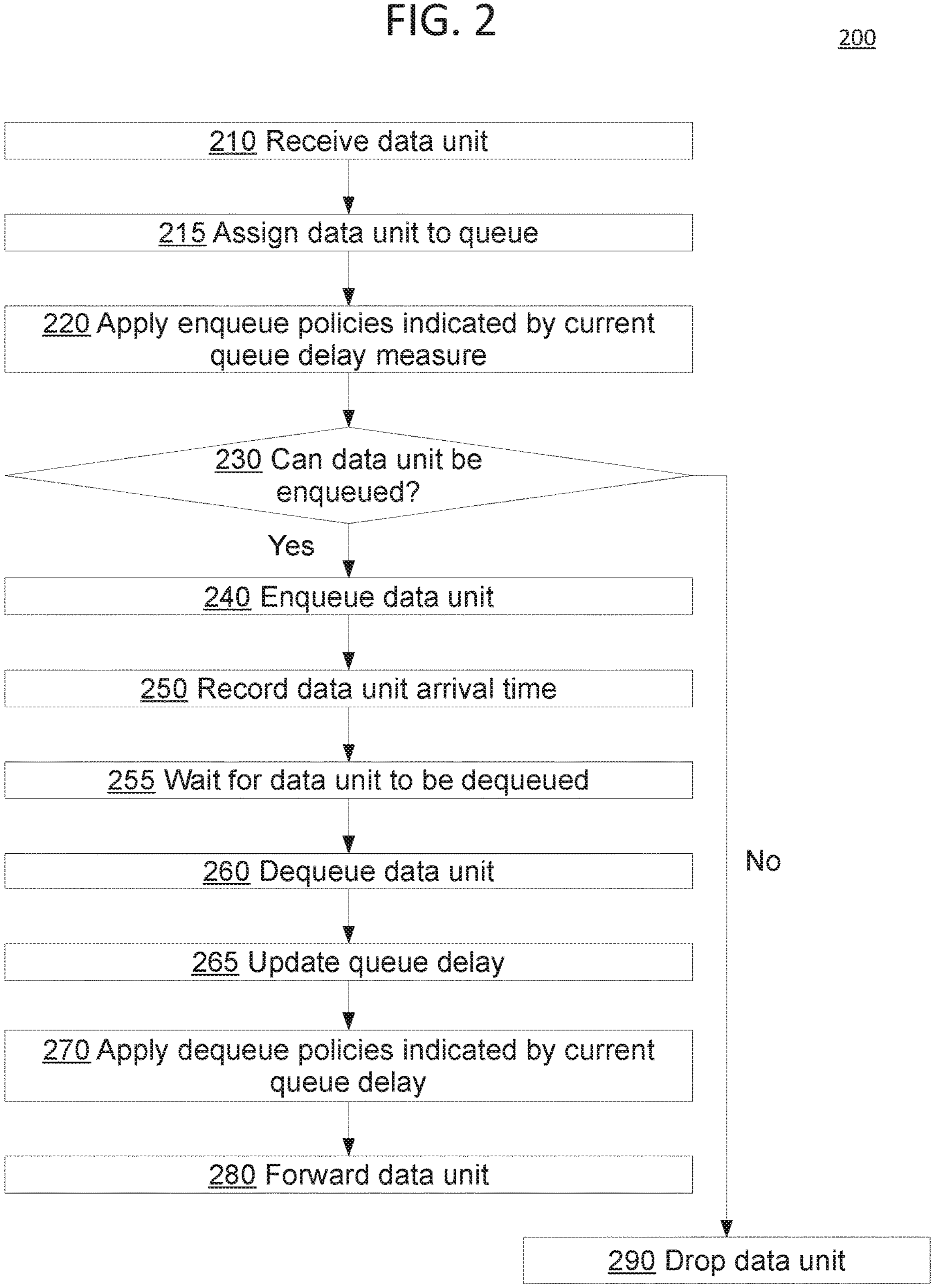
FIG. 2 illustrates a flow for processing a data unit while tracking queue delay in accordance with delay-based policies.

FIG. 2 illustrates a flow 200 for processing a data unit while tracking queue delay in accordance with delay-based policies, according to an embodiment.

Block 210 comprises receiving a data unit. Depending on the embodiment, the data unit may be a packet, cell, frame, message, or any other suitable data unit described herein. The data unit is received via a communication interface of the device, which may be directly connected to the sender ("source") of the data unit, or connected indirectly via one or more intermediary devices in a network.

Block 215 comprises assigned the data unit to a queue. The queue may be an ingress queue or egress queue, depending on the context and implementation. The determination of the queue to which the data unit is assigned may be made using any suitable forwarding mechanism. For instance, the determination may involve comparing information from the header of the data unit, such as a destination address, source address, destination port, source port, service class, data unit type, etc. to information in a forwarding table. For instance, a destination IP address may be compared to a prefix table to resolve a specific destination (e.g. port, port group, path, hop, etc.) to which the data unit should be forwarded. The data unit may then be assigned to a queue associated with that destination. Block 215 may further comprise selecting between multiple queues to which the data unit could be assigned (e.g. multiple queues associated with a single path). This selection may involve any suitable load-balancing mechanisms, including random selection, alternating selection, weighted selection, probabilistic selection, hash-based selection, and so forth. In some embodiments, a data unit may be assigned to multiple queues (e.g. for multicast traffic), in which case flow 200 would continue separately for each assigned queue.

Block 220 comprises applying any enqueue policies indicated by the current queue delay measure for the assigned queue. This may comprise any of a number of substeps, such as described with respect to FIG. 3. For example, the value of the current queue delay measure may be compared to configuration data for a WRED curve to determine a percentage of data units assigned to the queue that should be pre-emptively dropped. This percentage may be compared to the output of a random-number generator to determine whether the instant data unit should be dropped. As another example, the value of the current queue delay measure may be compared to a threshold to determine whether to apply a tail-drop policy. Of course, any other actions may be performed as a consequence of applying a delay-based enqueue policy, depending on the embodiment, and further examples are given elsewhere herein.

Block 230 comprises determining whether the data unit may be enqueued in the queue. Under normal operating conditions, this determination would usually be positive. However, when the network device is experiencing high-congestion or delay, a determination may instead be made to drop the data unit, in accordance with one of the policies applied in block 220, and/or in accordance with other policies or device logic. If the data unit can be enqueued, flow 200 proceeds to block 240. Otherwise, the data unit is dropped in block 290.

Block 240 comprises enqueueing the data unit in the queue. Enqueueing comprises, or is preceded by, buffering the data unit in a suitable buffer entry. Enqueueing may then comprise linking that buffer entry to a queue using any suitable queueing mechanism. The data unit is enqueued at the tail of the queue.

Block 250 comprises recording an arrival time of the data unit. The arrival time, in some embodiments, may be the time at which the data unit was enqueued, in which case block 250 is performed in response to block 240. However, depending on the configuration of the device, the arrival time may actually correspond to other events, such as the time the data unit was received at the device, or the time that the data unit is first processed by a particular component of the device, such as an ingress arbiter or traffic manager. In such cases, the arrival time may actually be recorded prior to block 240 or even block 215.

The arrival time may be recorded as a timestamp in terms of any suitable time measurement, such as a number of milliseconds, a number of clock cycles, etc. The arrival time may be recorded with the data unit, such as in a buffer entry, in the data unit header, or in associated metadata. In some embodiments, the arrival time may be recorded in metadata associated with the queue in which the data unit has been enqueued.

In some embodiments, block 250 is only performed for data units flagged as "marker" data units for the purposes of calculating queue delay. In other embodiments, block 250 is performed for all data units, but the arrival timestamp may be overwritten by a timestamp for another data unit if the data unit is not subsequently designated as a marker unit. For instance, queue management logic may be configured to preserve the arrival timestamp for the tail data unit of the queue in the event the next dequeued unit is a marker data unit, so that the tail data unit replaces the dequeued data unit as a marker. If the tail data unit is designated as a marker, its arrival timestamp is preserved by, for instance, copying it to a memory reserved for the marker timestamp. Otherwise, the arrival timestamp is overwritten by the arrival timestamp of the next data unit to enter the queue.

In yet other embodiments, all data units are treated as marker data units for the purposes of calculating queue delay, and their arrival timestamps are preserved throughout the queueing process.

Block 255 comprises waiting for the data unit to be dequeued. The data unit will gradually move to the head of the queue over time as other data units already within the queue are dequeued. The amount of time that it takes for the data unit to move to the head of the queue will vary depending on factors such as how many data units are in the queue and how frequently the queue is processed. These factors in turn may be affected by many other factors, such as the transmission rate of the implementing device, the priority of the traffic flow(s) to which the data units within the queue belong, the sizes of other queues, and so forth.

Block 260 comprises dequeuing the data unit. Block 260 occurs is performed after the data unit reaches the head of the queue. The data unit may not necessarily be dequeued immediately after reaching the head, but rather the dequeuing may be scheduled based on various factors, such as the priority of the queue relative to other queues within the device and the sizes of the other queues. Dequeuing the data unit comprises removing the data unit from the queue by, for example, removing metadata that links the data unit or the data unit's buffer entry to the queue.

Block 265 comprises, optionally, updating the queue delay measure for the queue. Block 265 is optional in that, depending on the embodiment, the queue delay may not necessarily be calculated each and every time a data unit is dequeued. For instance, the queue delay may, in some embodiments, be calculated when a data unit is dequeued only if the data unit is a marker data unit. Or, the queue delay may be calculated as part of a periodic background process. If an updated queue delay measure is not calculated for the data unit, the most recently calculated queue delay from a marker data unit or background process is stored and utilized for the data unit.

Block 270 comprises applying any dequeue policies indicated by the current queue delay measure for the queue, such as an ECN policy or other suitable policy. As with block 220, this may comprise any of a number of substeps, such as described with respect to FIG. 3. For example, the value of the current queue delay measure may be compared to configuration data for congestion notification packet marking to determine a probability that a data unit assigned to the queue will be marked with a congestion notification tag. This probability may be a threshold number (e.g. percentage, value between 0 and 1, a value in a range between a minimum and maximum random function output, etc.) that is compared to the output of a random-number generator to determine whether the instant data unit should be marked. In an embodiment, the operation of the probability over time is such that, on average, a data unit will be marked a certain percentage of the time. As another example, the value of the current queue delay measure may be compared to a threshold to determine whether to drop the data unit. Of course, any other actions may be performed as a consequence of applying a delay-based dequeue policy, depending on the embodiment, and further examples are given elsewhere herein Block 280, which is performed only if not rendered impossible by one of the applied policies in block 270 (e.g. as a consequence of the data unit having been dropped), comprises forwarding the data unit to its intended destination. This may comprise any suitable forwarding steps, such as sending the data unit to a packet processor, port, or other subcomponent associated with the path that is resolved to the data unit.

Returning to block 290, dropping a data unit comprises various actions and/or inaction, depending on the embodiment. For instance, dropping a data unit may comprise simply not adding the data unit to its assigned queue, or removing the data unit from that queue without forwarding the data unit to another component.

Both dropping a data unit and forwarding a data unit may, in some embodiments, further comprise sending a data unit (or rather information about the data unit) to garbage collection logic, so that the garbage collection logic can free the buffer space occupied by that data unit. In some embodiments, however, a data unit may be assigned to multiple queues (e.g. as a result of multicasting), and being dequeued or dropped from one queue does not necessarily mean the data unit has been dequeued or dropped from all assigned queues. Hence, the data unit would not be sent to garbage collection until it had been dropped or dequeued from all queues to which it had been assigned.

Flow 200 is but one example flow for processing a data unit in a network device. Other flows may include fewer or additional elements, in varying arrangements. For instance, in some embodiments, block 220 or block 270 may be omitted, so that policies are only evaluated on enqueue or dequeue. As another example, the updating of the queue delay measure in block 265 may trigger other steps, such as storing the updated queue delay measure for future reference, determining the policies currently applicable to the queue based on the updated queue delay measure, and/or storing information identifying those policies for future reference.

In embodiments where marker data units are used, block 265 might further comprise selecting a new marker data unit in the event the dequeued data unit is a marker data unit. The new marker data unit may be, for instance, the data unit at the tail of the queue, or any other non-marker data unit for which the arrival timestamp is still preserved.

Flow 200 is repeated for any number of data units received by the network device. Steps from some iterations of flow 200 may be performed concurrently with steps in other iterations of flow 200, depending on device bandwidth and processing resources.

3.2. Calculating Queue Delay

Figure 3:
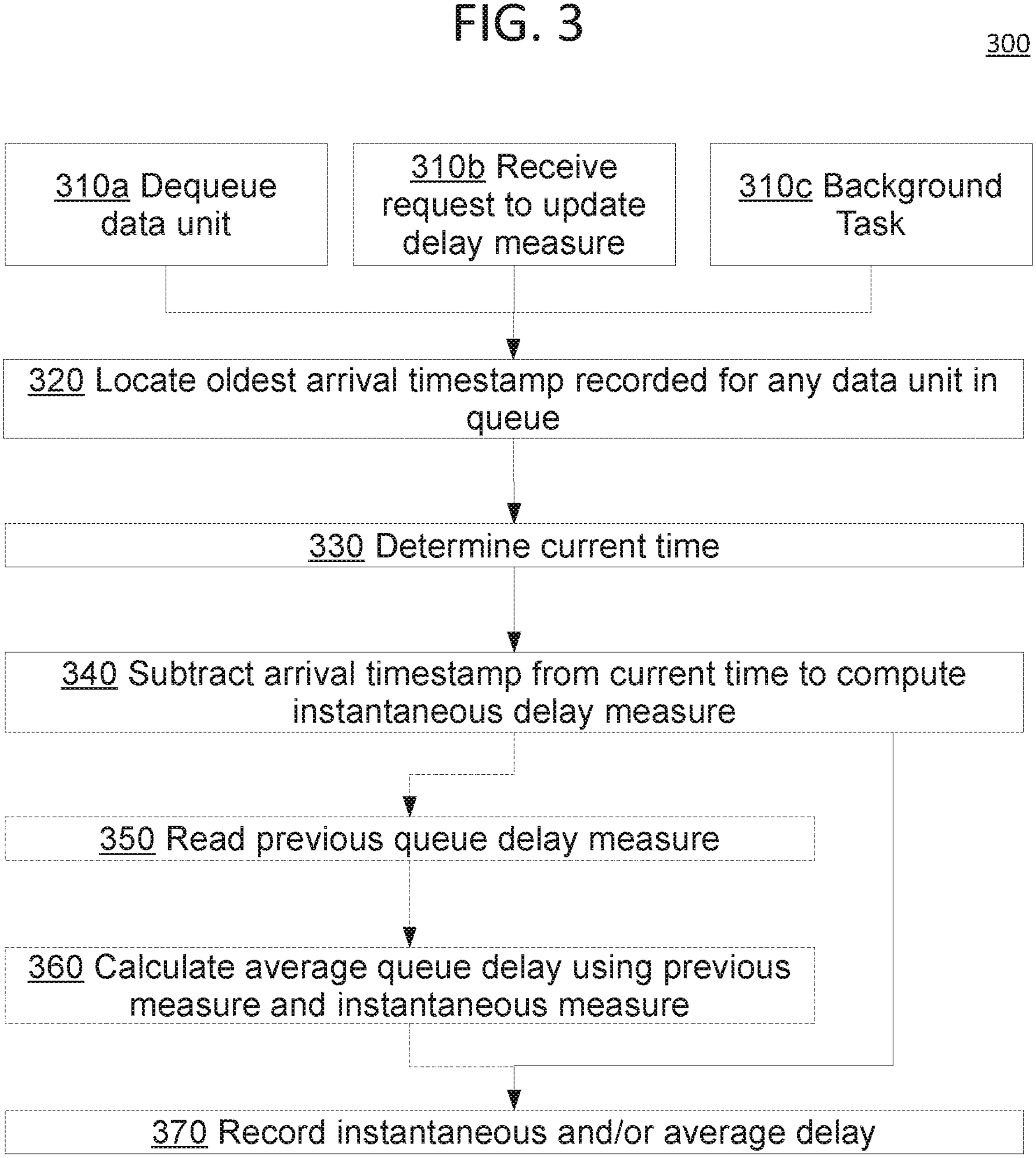
FIG. 3 illustrates a flow for updating a queue delay measure for a queue, according to an embodiment.

FIG. 3 illustrates a flow 300 for updating a queue delay measure for a queue, according to an embodiment. Flow 300 is performed in response to a triggering event. For example, depending on the embodiment, flow 300 may be triggered in response to one, some, or all of example blocks 310*a-c*.

The first of these example possible triggers is block 310*a*, which comprises dequeuing a data unit from the queue, as in blocks 260-265 of FIG. 2. The second of these example triggers is block 310*b*, which comprises receiving a request for an updated queue delay measure. Such a request might occur, for instance, when performing block 220 or 270 of flow 200, if policies and queue delay measures are not cached for future reference, or if the currently cached policies and queue delay measure are deemed to be too old.

The last of these example triggers is block 310*c*, which comprises executing a background update process. A background update process may be performed periodically or at other intervals for each queue, at frequencies that vary depending on the embodiment and available system resources. For instance, the background update process may be executed for a given queue once every ten clock cycles. The frequency may be adjusted based on the size of a queue or other factors. The background update process may perform other tasks as well, such as updating a queue size counter or other queue metadata. Of course, flow 300 may be triggered in response to other events instead or additionally.

Block 320 comprises locating the oldest arrival timestamp recorded for any data unit within the queue. Arrival timestamps may have been recorded for some or all of the data units within the queue as a result of block 250 of flow 200 or a similar process. In embodiments where all arrival timestamps are recorded and preserved, this will be the arrival timestamp of the data unit at the head of the queue. In the event that arrival timestamps are only preserved for marker data units, this will be the arrival timestamp for the marker data unit that is closest to the head of the queue. In the event that flow 300 is being performed in response to dequeuing a data unit, the dequeued data unit is considered to still be in the queue for this purpose, so that the arrival timestamp of the dequeued data unit is used, if available.

Block 330 comprises determining the current time. For example, block 330 may comprise inputting a current system time from the same time-keeping mechanism that was used to determine the arrival timestamp. Block 330 may be performed at any time between blocks 310 and 340. In instances where flow 300 is triggered by dequeuing a data unit, the current time may correspond to a departure time of the data unit. Although the departure time may be the same as the time at which the data unit is dequeued, in some embodiments the time may correspond to other departure-related events, such as sending the data unit to an egress block or packet processor.

Block 340 comprises subtracting the arrival timestamp from the current time to calculate the value of the instantaneous queue delay measure.

In some embodiments, the updated queue delay measure for the queue is the same as the instantaneous queue delay. In such embodiments, flow 300 proceeds to be block 370. In other embodiments, the updated queue delay measure is an average queue delay measure, and flow 300 proceeds to block 350.

Block 350 comprises reading the previous queue delay measure, as stored in block 370 of a previous iteration of flow 300.

Block 360 comprises calculating an average queue delay measure as a function of at least the previous queue delay measure and the instantaneous queue delay measure. For instance, the average queue delay may simply be the average of the previous queue delay measure and the instantaneous queue delay measure. Or, the average queue delay may be a weighted queue delay average, where the previous queue delay measure and the instantaneous queue delay measure may be multiplied by weights that cumulatively total a value of one. The products are then summed together. In an embodiment, the delay may be an exponentially weighted moving average, such as given by the following formula, where Qdelay(t) is the instantaneous measure, AvgQdelay (t−1) is the previous average, and N is used to weight the last average versus the most recently calculated instantaneous measure:

$$AvgQdelay(t)=AvgQdelay(t-1)*(1-2\hat{}-N)+Qdelay(t)*(2\hat{}-N)$$

Of course, other suitable functions may instead be used to compute an average value.

Block 370 comprises recording the value of the instantaneous queue delay measure, or average queue delay measure in embodiments where average is used, to a memory associated with the queue. The queue delay measure may then be read from the memory as needed, such as when determining a policy to implement.

Flow 300 is but one example flow for calculating queue delay. Other flows may include fewer or additional elements, in varying arrangements. For instance, in some embodiments, the measure may be returned directly to policy management logic or packet-switching logic. In some such embodiments, block 370 is optional in other words, the measure is used immediately instead of recorded for future use.

In an embodiment, the updated queue delay measure is otherwise derived from the instantaneous queue delay. For instance, the updated queue delay measure may be derived using an averaging function of the instantaneous queue delay along with previously observed queue delay measures. For instance, the least ten instantaneous queue delay measures may be stored in a circular cache, and averaged together. In an embodiment, each of these delays may be weighted, as described above.

3.3. Applying Delay-Based Policies

Figure 4:
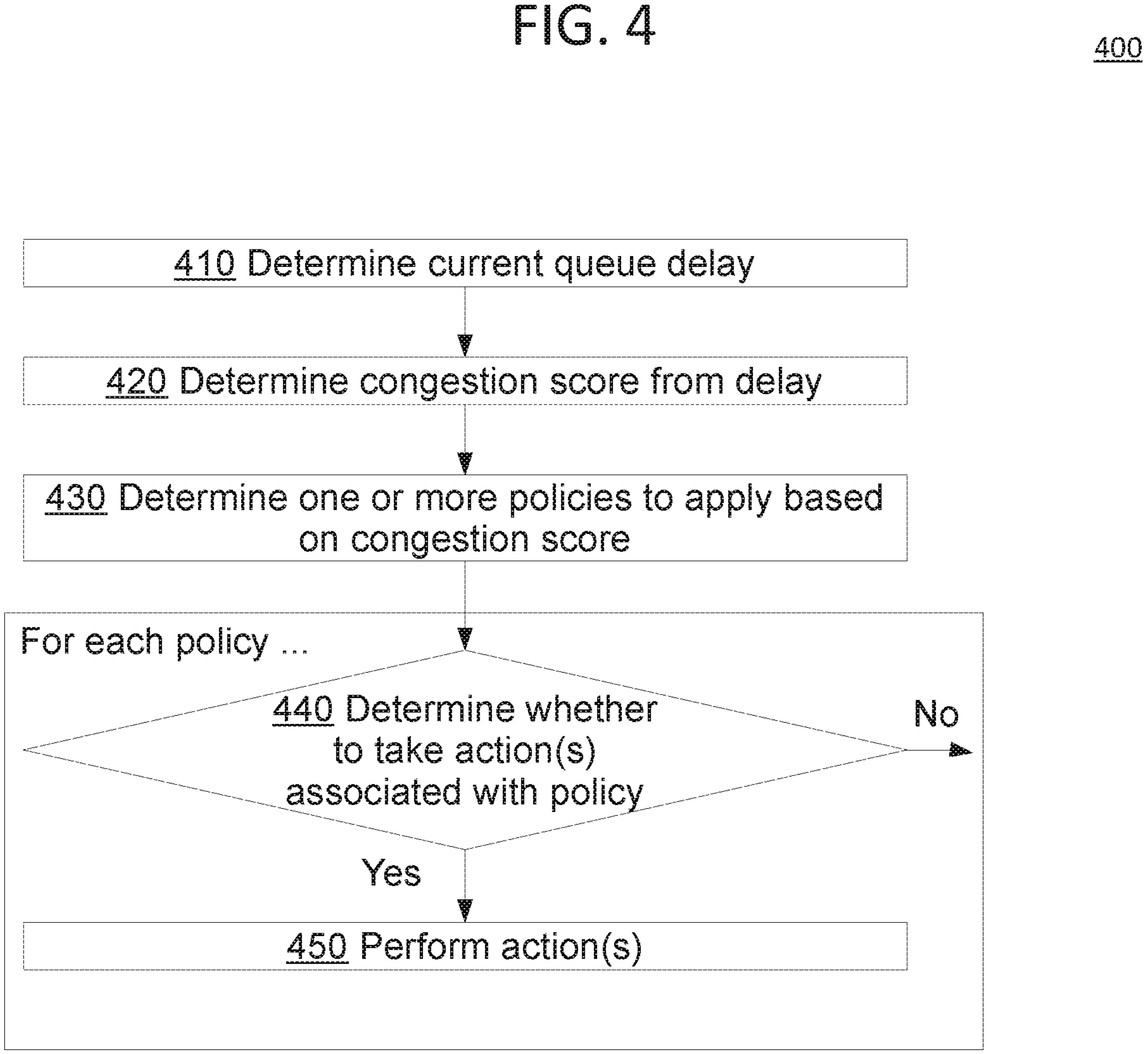
FIG. 4 illustrates a flow for applying delay-based policies to a data unit that has been assigned to a queue in a network device.

FIG. 4 illustrates a flow 400 for applying delay-based policies to a data unit that has been assigned to a queue in a network device, according to an embodiment. Flow 400 may be used, for example, to apply delay-based policies upon ingress of a data unit into a queue or upon egress of a data unit from a queue. For instance, flow 400 may be performed in the course of performing blocks 220 or 270 of flow 200. Of course, flow 400 may be performed by the packet-switching logic of a network device at other times as well, in conjunction with other process flows. Likewise, blocks 220 and 270 of flow 200 may be performed in other manners.

Block 410 comprises determining the current queue delay associated with the queue. In some embodiments, this may comprise reading the latest calculated queue delay value from a memory in which it has been recorded, such as in the course of performing block 370 of FIG. 3. Or, block 410 may comprise recalculating queue delay. For instance, this may involve triggering a queue delay update as described with respect to flow 300. The specific technique used may depend on the embodiment, as well as, in some cases, when the queue delay was last updated. For instance, there may be a timestamp indicating when the queue delay was last updated. If the timestamp indicates that the queue delay was updated within a recent period of time, the stored value may be used. Otherwise, the queue delay may be re-calculated.

Block 420 comprises determining a congestion score based on the queue delay. In some embodiments, this is a trivial step, as the queue delay is the congestion score. In other embodiments, a composite score may be calculated as a function of the queue delay and one or more other metrics, such as queue size. Examples of such functions and metrics are described, without limitation, in other sections.

Block 430 comprises determining one or more policies to apply based on the congestion score. This determination may involve, for instance, comparing the congestion score to policy configuration data to determine which policy or policies to apply. For instance, there may be one or more tables that map congestion scores, or ranges of congestion scores delimited by thresholds, to specific policies. These tables may be global, specific to a queue, or specific to a group of queues.

In an embodiment, the determination may be based on other factors as well, such as a traffic flow to which the data unit belongs. That is, a tail drop policy may apply only to data units from a certain traffic flow, such that data units from that flow are dropped while others are admitted into the queue. Or, a policy may indicate that data units from a certain traffic flow are always admitted, even if a non-flow-specific tail drop policy is currently active. For instance, different tables might be used depending on attributes of the data unit, such as a flow, source, class, etc.

In yet other embodiments, the determination may simply involve a reading stored policy identification data associated with the queue. The stored policy identification data identifies the policy or policies that were last determined to be active for the queue (e.g. last time the queue delay was calculated). For instance, in the simplest form, this may involve reading a bit stored in association with the queue to determine whether a tail drop policy is active. If the bit is currently set, all data units assigned to the queue may be dropped. Otherwise, all data units assigned to the queue are allowed to be enqueued.

In an embodiment, certain types of policies are only evaluated before enqueueing a data unit, while other types of policies are only applied when dequeuing a data unit. For instance, a delay-based tail drop policy might be applied only before enqueueing a data unit, while a delay-based marking policy might be applied only when dequeuing a data unit.

The number of policies identified may vary from embodiment to embodiment, but in an embodiment, there may be one policy for each possible policy type that is applicable to the current processing context (e.g. enqueue versus dequeue). For instance, there may be separate polices determined for each of a tail-drop policy type that indicates whether or not tail-drop is enabled for the queue, a congestion notification policy type that indicates a percentage of data units to mark (or a probability of marking) for congestion notification, a WRED policy type that indicates a percentage of data units to pre-emptively drop (or a probability of dropping), and/or reflection policy type that indicates a percentage of data units to reflect (or a probability of reflection). In some embodiments, there may be a default policy for each of these policy types, such as to not take any special action. Hence, if the congestion score is not explicitly mapped to any other policy, the default policy of handling the data unit as normal is used.

Blocks 440 and 450 are performed for each policy identified in block 430, if any. Block 440 comprises determining whether to take one or more delay-based actions indicated by the policy. A policy may include a frequency with which, or probability that, the corresponding delay-based action(s) will be performed on any given data unit. Block 440 may therefore comprise performing a calculation to determine if the processing of the current data unit falls within the specified probability or frequency, such that the action is actually performed. The calculation may involve, for instance, generating a random number using suitable hardware (e.g. a linear-feedback shift register) or equivalent software. The random number may then be compared to the percentage or probability specified in the policy. For instance, if the policy specified a probability that an action would occur as a percentage on a scale of 0 to 100, the random number could be normalized to the same scale and then compared to the percentage. If the random number fell below the percentage, it would be determined that the action should be taken. If the random number were above the percentage, the action would not be taken.

Any other mechanism for ensuring that an action is taken only some percentage of the time, or at some probability level, may be utilized. For instance, if a policy is to perform an action on one out of every three data units, a counter could be maintained and incremented with each data unit assigned to (or, depending on when flow 400 is being performed, dequeued from) the queue. Any time the counter is divisible by three, the action would be performed with respect to the newly enqueued (or dequeued) data unit. Similarly, a system clock could be utilized, such that if the current timestamp were divisible by three, the action would be performed on the data unit currently being processed.

In an embodiment, to avoid problems introduced by periodic patterns in the handling of data units, a modified counter mechanism may be utilized, where the amount being counted to is randomized within a range around a target counter value. For example, a countdown counter might begin at ten, and be decremented each time a data unit is enqueued. The action is performed only once the countdown timer reaches zero, at which point the countdown timer may be reset to ten. However, to avoid periodic patterns from performing the action on exactly every tenth data unit, the counter might instead be reset to a random value within a certain percentage of ten (e.g. in a range from eight to twelve).

Similar techniques may be utilized for counters that are based on data unit size as opposed to total data units. For instance, a counter may indicate to perform an action after a certain number of bytes have been processed, regardless of the number of data units received.

Of course, block 440 may be omitted for policies not associated with a probability or frequency, or if the probability or frequency is one hundred percent. Likewise, block 440 (and 450) would be skipped if the probability or frequency is 0.

If the determination of block 440 is positive, flow 400 proceeds to block 450, which comprises performing the one or more actions determined in block 440. Any suitable action may be performed, but in some embodiments block 450 may comprise performing one or more of: dropping a data unit, marking a data unit with congestion or other notification-related information, and/or reflecting a data unit, as described in other sections.

Depending on the embodiment, the action taken in block 450 may preclude further processing of the data unit. For instance, a dropped data unit would not later be enqueued or forwarded to a packet processor.

If the determination of block 440 is not positive, block 450 is not performed.

Flow 400 is but one example flow for applying delay-based policies. Other flows may include additional or fewer elements in varying arrangements. For instance, in an embodiment, the results of blocks 410-430 for a given queue could be cached or otherwise stored, either in an initial iteration of flow 400, or before flow 400 is ever performed. In such cases, blocks 410-430 may be replaced by a step of reading information identifying the currently applicable policy or policies from an appropriate memory. The stored value may be updated from time to time, such as whenever the queue delay measure is updated, or for predetermined iterations of flow 400 (e.g. every tenth iteration).

3.4. Example Delay-Based Policies and Actions

The following examples of delay-based policies and actions are given for illustrative purposes, and not by way of limitation. Other types of policies may be implemented. Likewise, the example policies below may vary with respect to when they are applied to a data unit (dequeue, enqueue, etc.), what type of delay measure is used (average, moving average, instantaneous, etc.), whether a congestion score is used in place of the queue delay measure, whether the determination to perform an action is counter-based or probability-based, what type of action is performed, and so forth.

Delay-Based WRED

Figure 5:
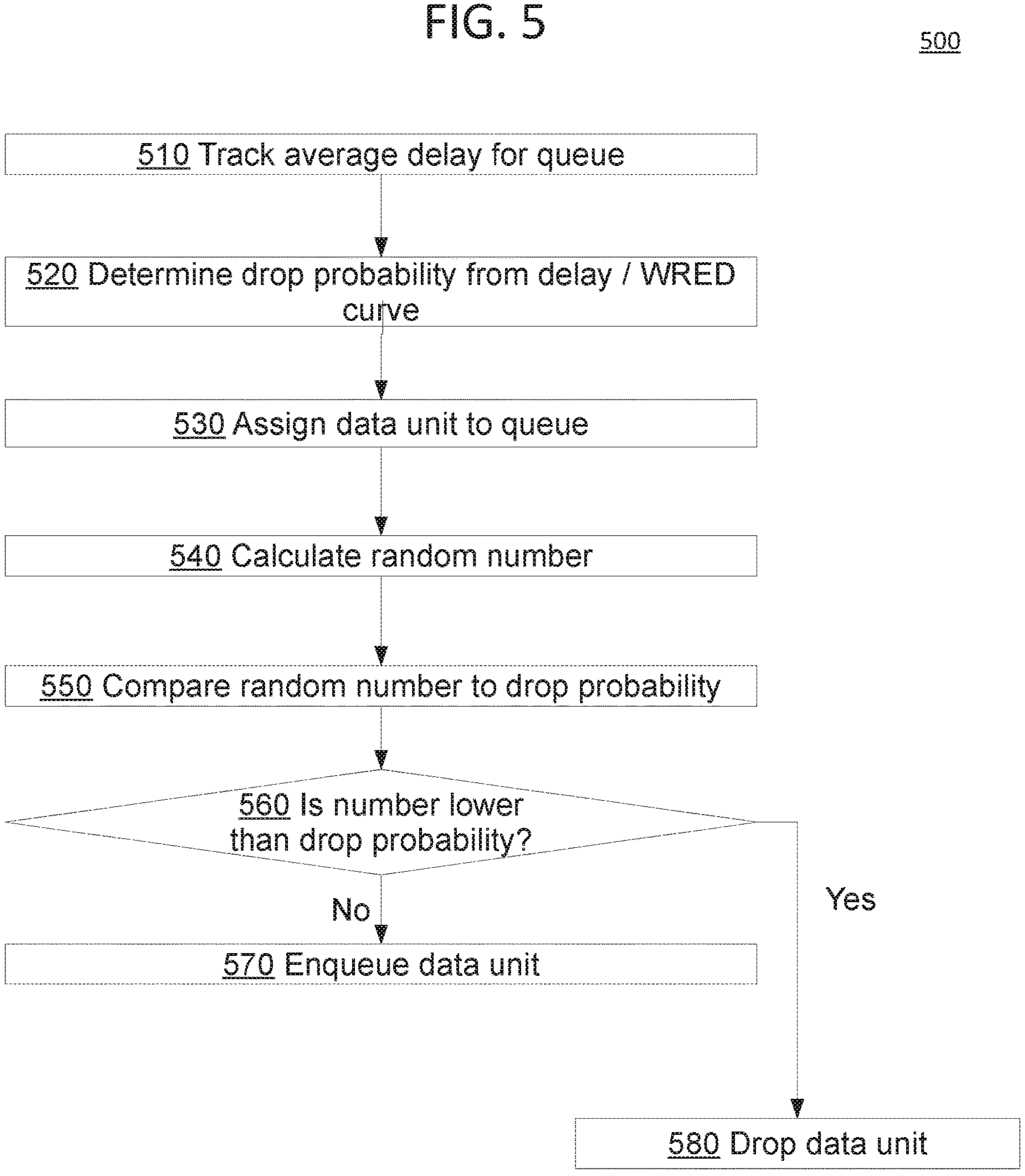
FIG. 5 illustrates an example flow for implementing delay-based weighted-random early detection ("WRED") in a network device.

According to an embodiment, the techniques described herein are used to implement delay-based packet reflection. FIG. 5 illustrates an example flow 500 for implementing delay-based weighted-random early detection ("WRED") in a network device, according to an embodiment. Block 510 comprises tracking an average queue delay measure for a queue. For example, block 510 may comprise tracking delay using marker-based techniques or queue residence time (e.g. the difference between the most recently dequeued data unit's arrival and departure timestamps), such as described elsewhere herein.

Block 520 comprises calculating or otherwise deriving a drop probability for the queue from a WRED curve. The WRED curve may be defined by any suitable mapping mechanism, such as a function of the queue delay, lookup table, etc. There may be different WRED curves for each queue, for each group of queues, or there may be a global WRED curve. In an embodiment, the selected WRED curve may also or instead vary depending on characteristics of the data unit assigned to the queue in block 530 (which would thus occur before block 520). Such characteristics may include, for instance, traffic flow, egress port identifier, source address, etc.

The mapping mechanism is such that the drop probability increases as the queue delay increases, from a minimum probability at a minimum queue delay threshold to a maximum probability at a maximum queue delay threshold. The minimum probability may be any suitable value, though is often zero. Similarly, the minimum queue delay may be any value, though is typically greater than zero, so as to avoid unnecessarily dropping data units when the queue delay is relatively small. Likewise, the maximum probability may be any suitable value, including one hundred percent.

Although the term curve suggests that the drop probability plotted against the queue delay would produce a curve, the actual plot may be linear, comprise steps, and/or take other shapes. For instance, the plot may be linear up to the maximum queue delay threshold, at which point it may step immediately to one hundred percent. In some cases, the drop probability increases only at discrete queue delay thresholds. For instance, the drop probability might be the same for all queue delay values between a first threshold and a second threshold. In other cases (e.g. where the mapping mechanism involves a function), the drop probability increases gradually throughout the curve.

Note that, within the framework of the method flows described in previous sections, each possible drop probability would amount to a different policy.

Block 530 comprises assigning a data unit to the queue. For instance, a traffic manager may utilize a destination address, flow identifier, and/or other information to identify a queue to assign the data unit to, as described in other sections. However, before the data unit may be enqueued in the assigned queue, blocks 540-560 are performed.

Block 540 comprises calculating a random or pseudo-random number, using any suitable technique. Block 550 comprises comparing the random number to the current drop probability for the queue. Block 560 comprises determining whether the random number is lower than the drop probability. If not, the data unit is enqueued in block 570 (except in the event that application of another policy drops the data unit or otherwise prevents performance of block 570). Otherwise, in block 580, the data unit is dropped rather than enqueued.

Note that blocks 510 and 520 do not necessarily need to be performed for each and every data unit that is processed. For instance, blocks 510 and 520 may be performed only at periodic or other intervals. Block 550 would comprise reading the drop probability, as last calculated, from a memory in which it was stored. Or, the drop probability may be re-calculated each time a comparison is performed.

Delay-Based Packet Marking

Figure 6:
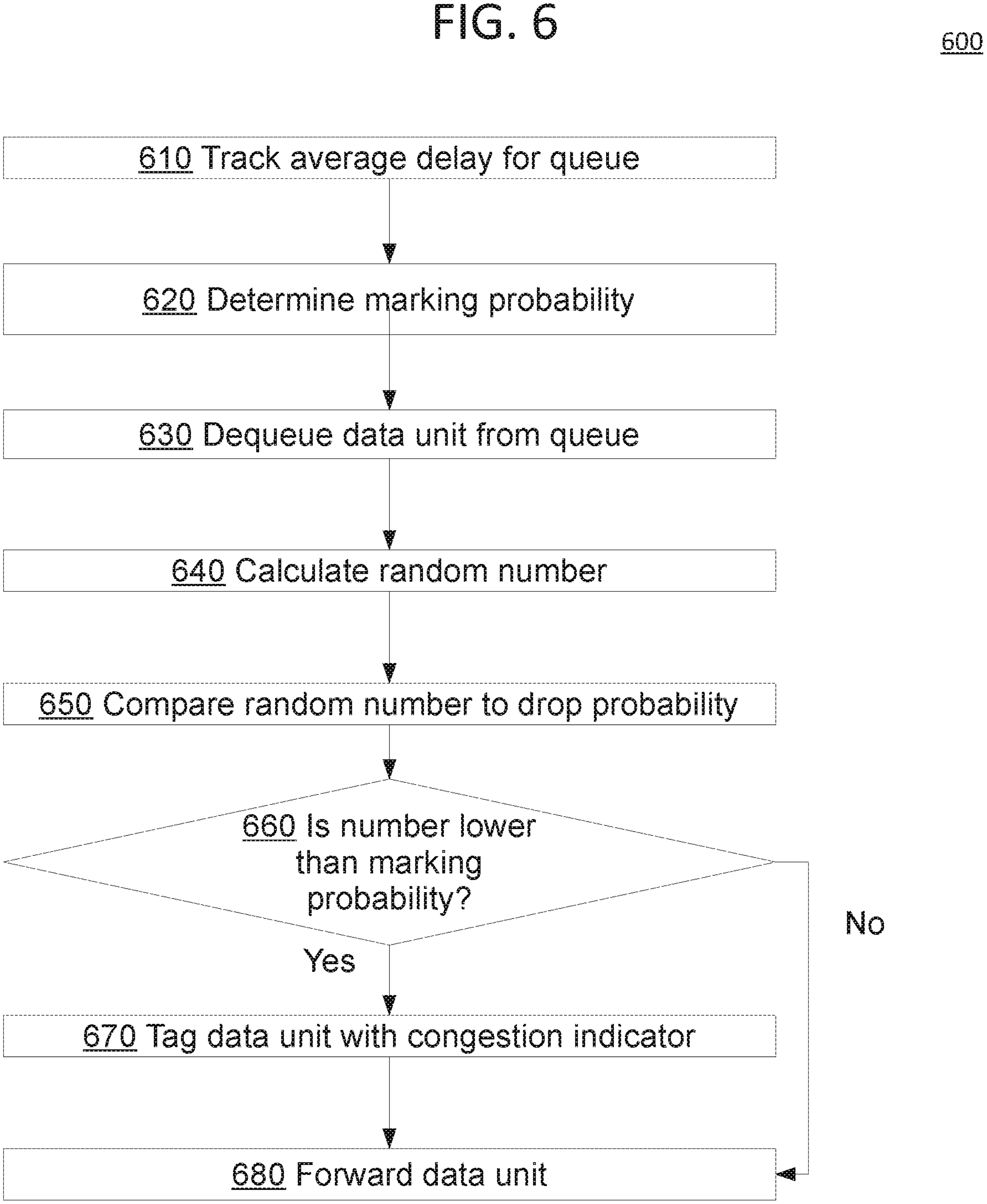
FIG. 6 illustrates an example flow for implementing delay-based packet marking in a network device.

According to an embodiment, the techniques described herein are also or instead used to implement delay-based packet marking. FIG. 6 illustrates an example flow 600 for implementing delay-based packet marking in a network device, according to an embodiment. Block 610 comprises tracking an average queue delay measure for a queue, as in block 510.

Block 620 comprises calculating or otherwise deriving a marking probability for the queue from marking configuration data. Similar to the WRED curve, the marking configuration data may be specified using any suitable mapping mechanism, such as a function of the queue delay, lookup table, etc. The mapping mechanism is such that the marking probability increases as the queue delay increases, also in similar manner to the WRED curve. Note that, within the framework of the method flows described in previous sections, each possible marking probability would amount to a different policy.

Block 630 comprises dequeuing a data unit from the queue. Note that, although delay-based marking policies may be applied on enqueue or even while the data unit is already within the queue, in an embodiment they may be more beneficial to apply on dequeue, so that congestion-related problems may be reported more quickly.

Block 640 comprises calculating a random or pseudo-random number, using any suitable technique. Block 650 comprises comparing the random number to the current marking probability for the queue. Block 660 comprises determining whether the random number is lower than the marking probability. If so, the data unit is tagged in block 670. Otherwise, the data unit is not manipulated. In either event, the data unit is then forwarded towards its destination in block 680 (except in the event that application of another policy drops the data unit or otherwise prevents performance of block 680).

The tagging in block 670 may comprise, for information, inserting a congestion notification indicator (e.g. ECN, QCN, etc.) in the data unit header. The tagging may also or instead comprise inserting values for one or more metrics, as described elsewhere herein.

For the same reasons as described with respect to FIG. 5, note that blocks 610 and 620 do not necessarily need to be performed for each and every data unit that is processed, but the marking probability may instead be stored and recomputed at intervals.

Delay-Based Packet Reflection

Figure 7:
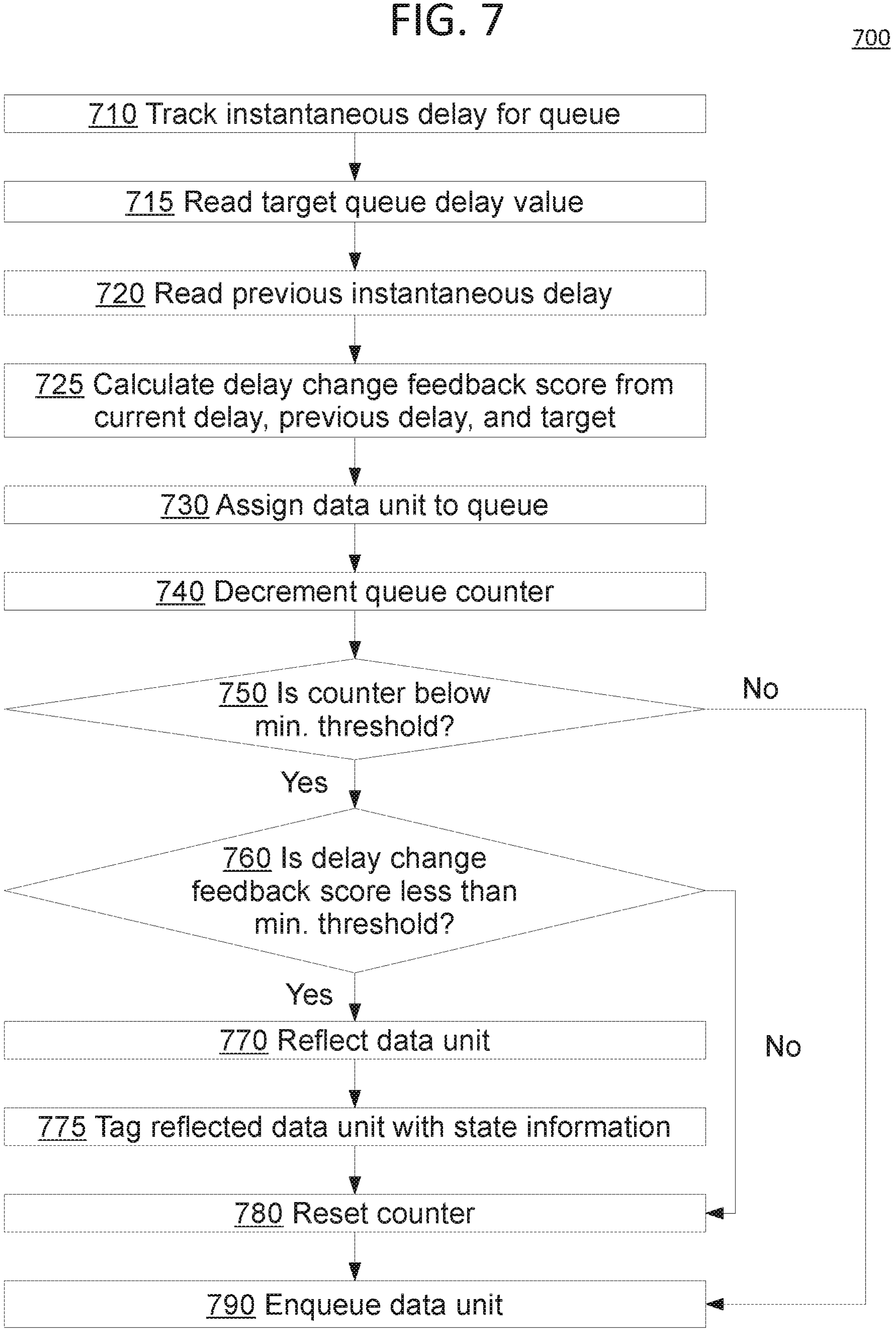
FIG. 7 illustrates an example flow for implementing delay-based packet reflection in a network device.

According to an embodiment, the techniques described herein are also or instead used to implement delay-based packet reflection. FIG. 7 illustrates an example flow 700 for implementing delay-based packet reflection in a network device, according to an embodiment.

Block 710 comprises tracking a queue delay measure for a queue. In some embodiments, an average queue delay may be used and compared to a reflection probability, in similar manner to FIGS. 6 and 7. However, as illustrated in FIG. 7, packet reflection is instead accomplished via an alternative technique, in which the delay measure tracked in block 710 is an instantaneous measure, as opposed to an average measure. Again, the delay may be determined using marker-based techniques or queue residence time, as described in other sections.

Rather than basing policy determination on the queue delay measure directly, a delay change feedback score is calculated as a function of the current queue delay and the most recently calculated queue delay. Block 715 thus comprises reading a target queue delay value assigned to the queue, either individually or for a group of which the queue is a member. Block 720 comprises reading the last instantaneous queue delay measure to have been recorded, aside from the one determined in block 710.

Block 725 comprises calculating the delay change feedback score by subtracting the current queue delay measure, and a weighted difference between the current queue delay and the most recently calculated queue delay, from the target queue delay. The weight for the difference may be any suitable weight, such as a fraction of one, and may be adjusted from embodiment to embodiment. The weight may be global, or specific to a queue or group of queues. In an embodiment, the delay change feedback score is capped on the low end by negative two times the weight plus one, times the target delay value. The delay change feedback score is capped on the high end by zero.

Block 730 comprises assigning a data unit to the queue, in similar manner to block 530. Block 740 comprises decrementing a queue counter by an amount associated with the data unit. The amount may be either a fixed amount for all data units (e.g. one) or an amount that is proportional to the size of the data unit (e.g. the number of bytes in the data unit).

Block 750 comprises determining whether the counter has fallen below zero (or to zero or some other minimum counter threshold, in other embodiments). If not, then flow 700 skips on to block 790, in which the data unit is enqueued in the queue. Otherwise, flow 700 proceeds to block 760.

In block 760 the delay change feedback score is checked. If the delay change feedback score is less than zero (or some other minimum feedback threshold, in other embodiments), then flow 700 proceeds to block 770. Otherwise, flow 700 skips to block 780.

Block 770 comprises reflecting the data unit. Reflecting the data unit generally comprises returning a reflected data unit back to the sender of the data unit, such as to a source address listed in a data unit header. In an embodiment, the reflected data unit is a copy of the original data unit, whose destination address is changed to be the same as the source address of the original data unit. In another embodiment, the original data unit is itself the reflected data unit. In some embodiments, the reflected data unit, whether original or copy, is reduced in size. For instance, the reflected data unit may be stripped of, or carry a truncated version of, the payload of the original data unit. In an embodiment, certain header fields may also be removed.

In any case, the traffic management logic of the device places the reflected data unit in the appropriate queue for returning to the sender of the data unit, and the packet-switching logic of the device thus returns the reflected data unit back to the sender of the data unit. In some embodiments, reflecting the data unit may further involve tunneling the data unit to the sender, or to a designated intermediate node. In an embodiment, the reflected data unit need not be received by the sender, but may instead be intercepted by an intermediary node comprising logic configured specially for processing reflected data units.

Example reflection techniques are described, without limitation, in further detail in U.S. Pat. No. 10,389,643 to Matthews et al., entitled "Reflected Packets," which is hereby incorporated by reference for all purposes as if set forth in its entirety herein.

Block 775, which is optional and may be performed at any time before the reflected data unit departs the device, comprises tagging the data unit with relevant information indicating the state of the queue and/or the device. Such information may include, without limitation, the current queue delay measure, the current queue size, a buffer fill level, sizes or delays associated with other queues, a quantized value reflecting some or all of the foregoing, an identifier of the network device that reflected the packet, a tag indicating that the data unit is a reflected data unit, and so forth. In an embodiment, the tagged information may include metrics specific to a flow to which the data unit belongs, metrics specific to queue or group of queues, metrics specific to a port or group of ports, and/or global metrics.

Block 780 comprises resetting the counter. In an embodiment, the counter is always reset to the same value. In another embodiment, the delay change feedback score further affects the policy by controlling the size of the counter when it is reset, thereby affecting the frequency with which reflection may occur. For instance, the size of the counter when reset may be determined based on the delay change feedback score, using a table, function, or other mapping mechanism. In this manner, the size of the counter is at least indirectly based on the queue delay measure, growing inversely relative to the queue delay measure. For instance, the counter may be reset to a smaller value for larger queue delays and a larger value for smaller queue delay measure. This results in data units being reflected more frequently as the queue delay measure grows, thereby implementing different policies with reflect to how often data units should be reflected. In an embodiment, the counter may instead be reset based on the queue delay measure directly.

In an embodiment, the counter is reset to a value that is at least partially randomized. For example, the counter may be randomized to a value that is within twenty percent of a target value calculated as a function of the queue delay measure.

From block 780, flow 700 may or may not proceed to block 790 depending on the embodiment and/or whether the data unit was reflected. As mentioned, block 790 comprises forwarding the data unit. If the data unit was not reflected, then block 790 should be performed, (except in the event that application of another policy drops the data unit or otherwise prevents performance of block 790). However, if the data unit was reflected, then block 790 may or may not be performed for the original data unit, depending on the embodiment or even the specific reflection policy.

Figure 8:
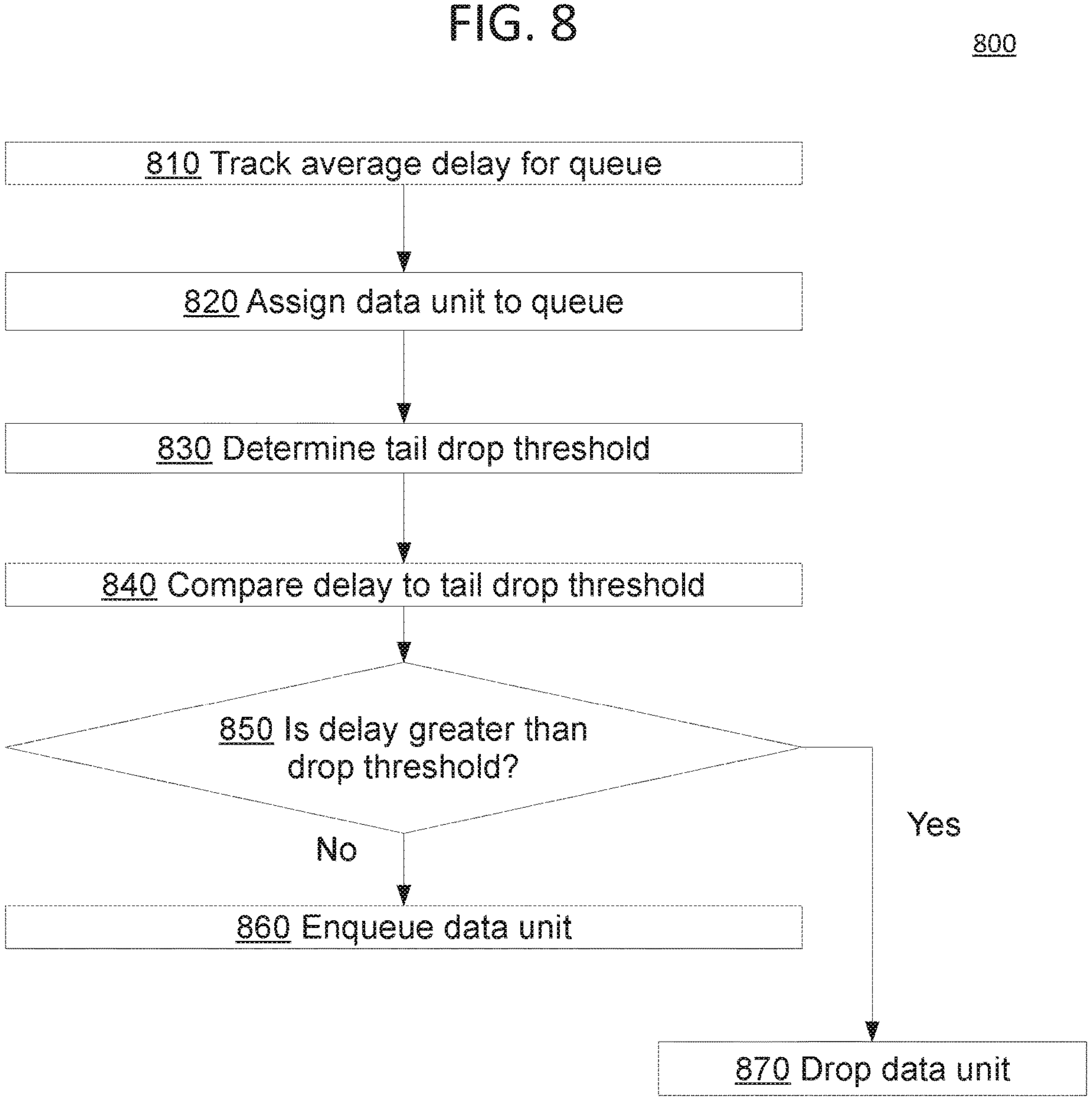
FIG. 8 illustrates an example flow for implementing delay-based tail drop in a network device.

Note that while the counter mechanism of flow 700 may have certain advantages when used for packet reflection, the mechanism may be used in place of probability-based mechanisms in other methods, including without limitation, those of FIGS. 5, 6, and 8.

Delay-Based Tail Drop

According to an embodiment, the techniques described herein are also or instead used to implement delay-based tail drop. Among other purposes, a delay-based tail drop policy may be utilized, for instance, for network traffic used by an application that requires delivery of data units within a certain amount of time. Since the application cannot make use of data units with more than a certain amount of delay, it may be more beneficial in certain cases to remove data units from the network when the delay of a queue associated with that application reaches a certain threshold rather than wait for the destination to discard the data unit. Of course, delay-based tail drop may have other advantages.

FIG. 8 illustrates an example flow 800 for implementing delay-based tail drop in a network device, according to an embodiment. Block 810 comprises tracking an average queue delay measure for a queue, as in block 510. The delay may be calculated in block 810, or read from a memory in which the most recently calculated delay is stored.

Block 820 comprises assigning a data unit to the queue, as described with respect to block 530 above.

Block 830 comprises determining a tail drop threshold. The tail drop threshold may be global, queue-specific, or specific to a group of queues. Moreover, in an embodiment, the tail drop threshold may further depend on a characteristic of the data unit, such as the identifier of a flow to which the data unit belongs, egress port identifier, source address, etc. For instance, there may be a threshold table that specifies different tail drop thresholds for different traffic flows assigned to the same queue.

Block 840 comprises comparing the queue delay measure to the tail drop threshold. Block 850 comprises determining whether the queue delay measure is higher than the tail drop threshold. If not, the data unit is enqueued in block 860 (except in the event that application of another policy drops the data unit or otherwise prevents performance of block 860). Otherwise, in block 870, the data unit is dropped rather than enqueued.

3.5. Composite Scoring

As explained in other sections, rather than relying solely on a queue delay measure for determining which policies to implement, the policy management logic may utilize a congestion score that combines the queue delay measure with other metrics. In some embodiments, this congestion score is a composite congestion score that combines queue delay with queue size.

Figure 9:
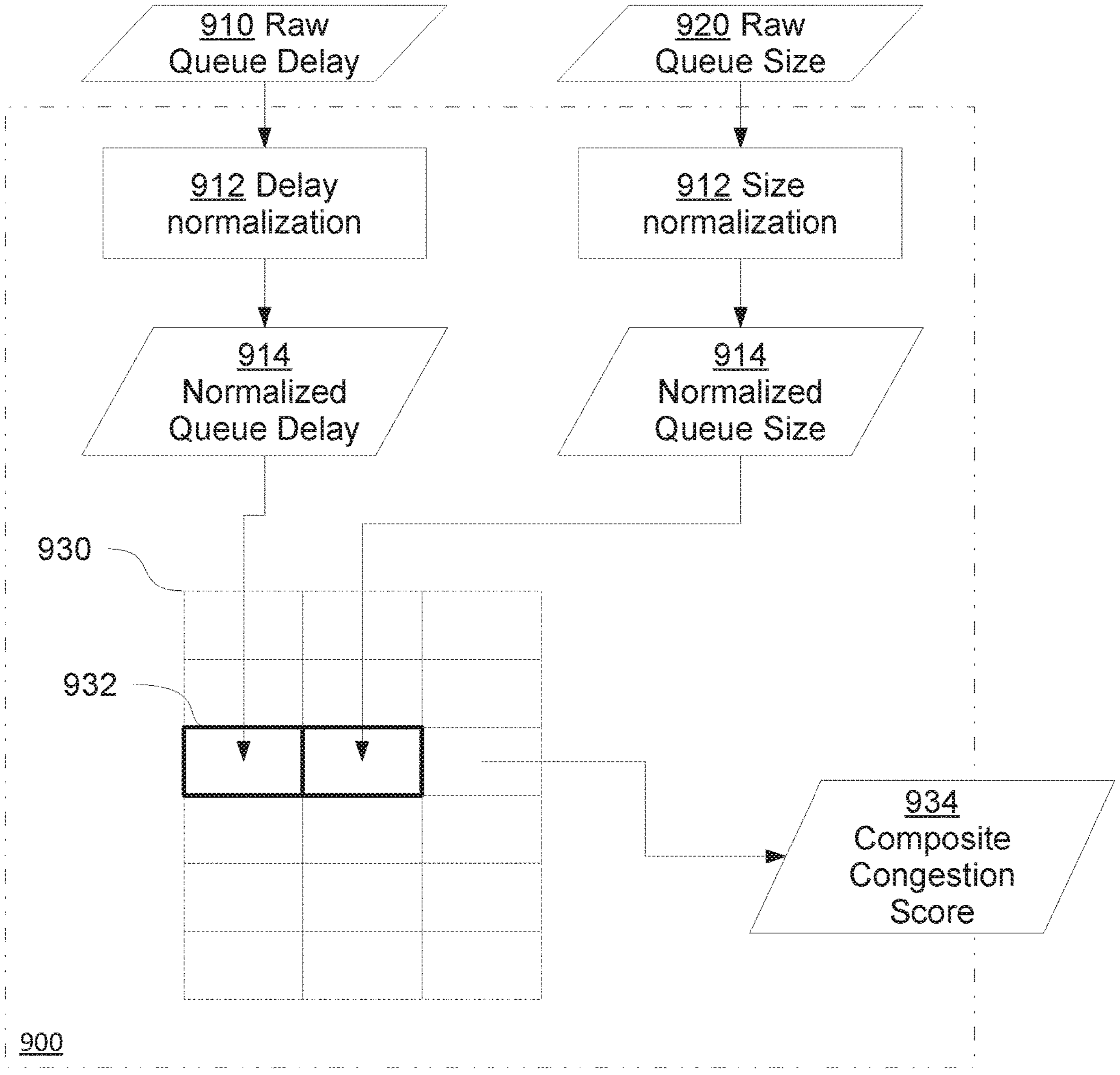
FIG. 9 illustrates an example composite congestion scoring subsystem.

FIG. 9 illustrates an example composite congestion scoring subsystem 900, according to an embodiment. A raw queue delay measure 910 and raw queue size measure 920 for a queue are inputted into subsystem 900. The raw queue delay measure 910 and raw queue size measure 920 may be instantaneous measures, or they may be average measures, such as moving averages. Methods for calculating both inputs are described in other sections.

The raw queue delay measure 910 is inputted into a queue delay normalization component 912. The queue delay normalization component 912 converts the raw queue delay measure 910 into a normalized queue delay 914. The queue delay normalization component 912 may utilize any suitable mapping mechanism for the conversion, such as a conversion table or function. For instance, there may be a table that maps different ranges of values for the raw queue delay measure 910 to one of three different normalized queue delay 914 values (e.g. 0 for normal, 1 for server, and 2 for critical).

Similarly, the raw queue size measure 920 is inputted into a queue size normalization component 912 that converts the raw queue size measure 920 into a normalized queue size 924. The queue size normalization component 922 may likewise utilize any suitable mapping mechanism for the conversion. The mapping mechanism used for the queue size normalization component 922 need not necessarily be the same as that used for the queue delay normalization component 912. Nor does the range and scale of possible values for normalized queue size 924 necessarily need to be the same as the normalized queue delay 914 values (though they may be).

The normalized queue delay 914 and normalized queue size 924 are then utilized together as a congestion index 932 for looking up a composite congestion score 934 in a congestion mapping table 930. Such a table may, for instance, have a separate entry for each possible combination of values for normalized queue delay 914 and normalized queue size 924. Each entry may specify a composite congestion score 934 for the corresponding combination of values for normalized queue delay 914 and normalized queue size 924. Such a table 930 may be user-configurable. In some embodiments, there may be different tables for different queues or groups of queues.

The composite congestion score 934 may then be used in place of the queue delay measure for purposes of policy determination. For instance, a WRED curve or marking probability mapping may be based on composite congestion score 934 instead of queue delay 910 or normalized queue delay 914. Or, a counter mechanism could be based on composite congestion score 934.

Subsystem 900 is but one example of a composite congestion scoring mechanism. Other mechanisms may include fewer or additional elements in varying arrangements. For instance, table 930 may be replaced by a congestion scoring function that inputs normalized queue delay 914 and normalized queue size 924. In another embodiment, one or both of the normalization components may be omitted, and the congestion index 932 instead uses the raw queue delay measure 910 and raw queue size measure 920 directly.

In yet another embodiment, a single-value congestion index 932, or the congestion score 934 itself, may be calculated from a function of the raw queue delay measure 910 and raw queue size measure 920. For instance, in an embodiment, such a function might be $(1/N)*(A*Qd+B*Qs)$. The variables A, B, and N may be configurable weights, while Qd is the queue delay and Qs is the queue size. Of course, other functions may also be used.

In an embodiment, a composite congestion score may further be determined based on other metrics, such as described in other sections.

3.6. Telemetry Extensions to Congestion Notification Marking

According to an embodiment, when marking a data unit for congestion notification purposes (e.g. ECN), a network switching device may include additional telemetry data to assist the sending and receiving nodes better respond to the congestion. Such telemetry data may include, without limitation, a queue size, rate of change of queue size, a queue delay, a rate of change of queue delay, a number of flows in a queue or port, a number of those flows considered to be "heavy" based on a comparison of flow volume to thresholds, a queue transmission utilization level, a queue reception utilization level, an expected queue transmission rate, an average queue transmission rate, and/or a queue drain rate (indicating how fast the queue is being emptied of data units). Such telemetry data may include instantaneous, average, and/or normalized metric values. Moreover, in an embodiment, the telemetry data may be relative to an attribute of the data unit, such as a traffic type, flow identifier, source, etc.

4.0. EXAMPLE IMPLEMENTING SYSTEMS

As already mentioned, the techniques described herein involve delay-based actions on network traffic passing through network switches and/or other network devices with packet-switching logic. This section describes, in greater detail, example packet-switching logic components within network devices. However, the techniques described herein are also useful in switches and contexts other than those described in this section.

4.1. Networks

Figure 10:
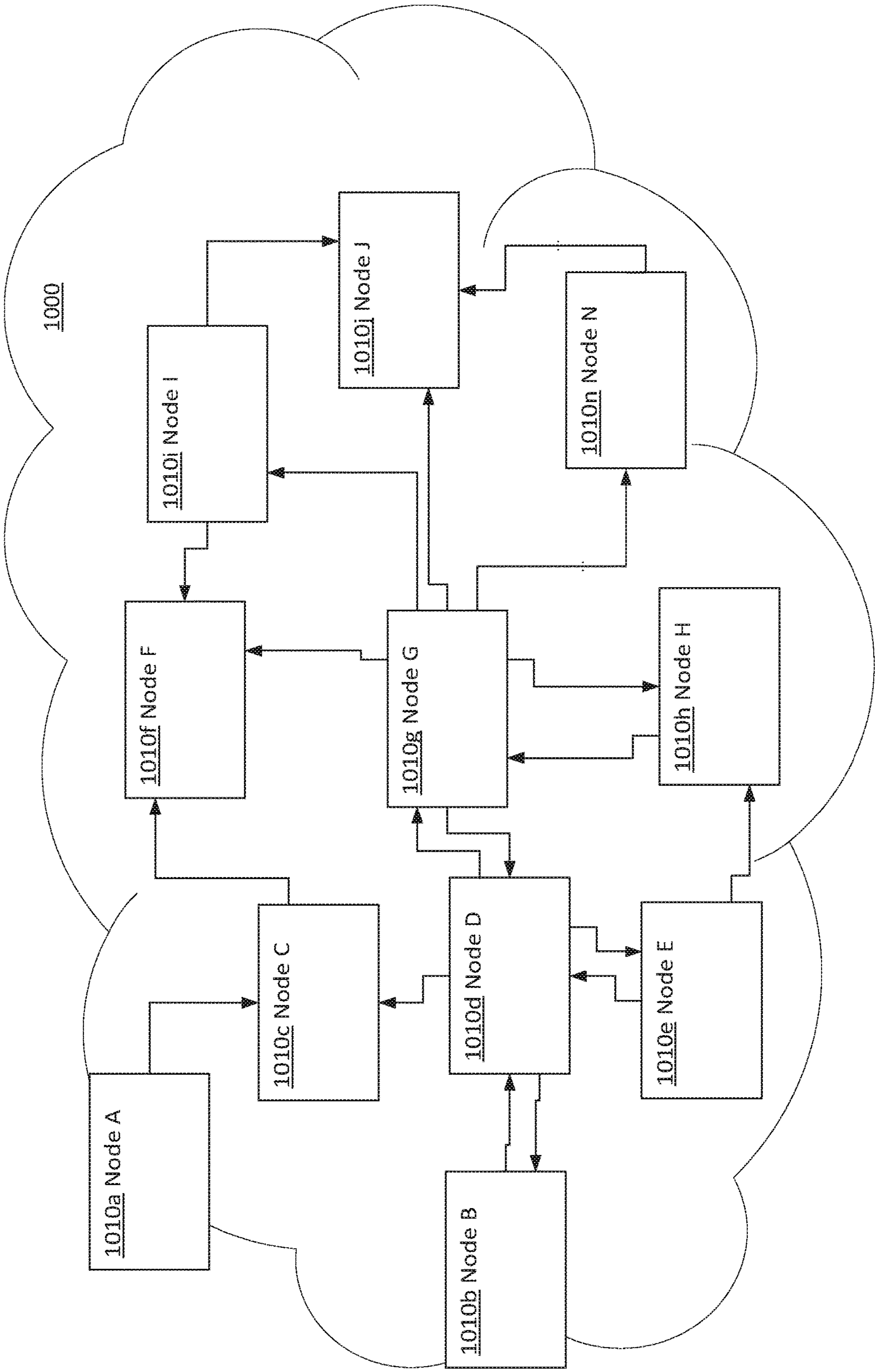
FIG. 10 is an illustrative view of various aspects of an example networking system in which the techniques described herein may be practiced.

FIG. 10 is an illustrative view of various aspects of an example networking system 1000, also referred to as a network, in which the techniques described herein may be practiced, according to an embodiment. Networking system 1000 comprises a plurality of interconnected nodes **1010*a*-1010*n* (collectively nodes 1010), each implemented by a different computing device. For example, a node 1010 may be a single networking computing device, such as a router or switch, in which some or all of the processing components described herein are implemented in application-specific integrated circuits (ASICs), field programmable gate arrays (FPGAs), or other integrated circuit(s). As another example, a node 1010** may include one or more memories storing instructions for implementing various components described herein, one or more hardware processors configured to execute the instructions stored in the one or more memories, and various data repositories in the one or more memories for storing data structures utilized and manipulated by the various components.

Each node 1010 is connected to one or more other nodes 1010 in network 1000 by one or more communication links, depicted as lines between nodes 1010. The communication links may be any suitable wired cabling or wireless links. Note that system 1000 illustrates only one of many possible arrangements of nodes within a network. Other networks may include fewer or additional nodes 1010 having any number of links between them.

4.2. Data Units

While each node 1010 may or may not have a variety of other functions, in an embodiment, each node 1010 is configured to send, receive, and/or relay data to one or more other nodes 1010 via these links. In general, data is communicated as series of discrete units or structures of data represented by signals transmitted over the communication links.

When a node 1010 receives a unit of data, it typically examines addressing information within the unit of data (and/or other information within the unit of data) to determine how to process the unit. The addressing information may be, for instance, a Media Access Control ("MAC") address, an Internet Protocol (IP) address, MPLS label, and/or any other suitable information. If the addressing information indicates that the receiving node 1010 is not the destination for the data unit, the receiving node 1010 may look up the destination node 1010 within receiving node's routing information and route the data unit to another node 1010 connected to the receiving node 1010 based on forwarding instructions associated with the destination node 1010 (or an address group to which the destination node belongs). The forwarding instructions may indicate, for instance, an outgoing port over which to send the unit of data, a label to attach the unit of data, etc. In cases where multiple paths to the destination node 1010 are possible, the forwarding instructions may include information indicating a suitable approach for selecting one of those paths, or a path deemed to be the best path may already be defined.

Addressing information, flags, labels, and other metadata used for determining how to handle a data unit are typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node 1010 the meaning of the field.

Different nodes 1010 within a network 1000 may send, receive, and/or relay data units at different communication levels, or layers. For instance, a first node 1010 may send a unit of data at the transport layer (e.g. a TCP segment) to a second node 1010 over a path that includes an intermediate node 1010. This unit of data, which may sometimes first be broken into smaller units, may be encapsulated in units of data at various sublevels before it is transmitted from the first node 1010. For example, a TCP segment may be encapsulated into IP packets, those IP packets may be encapsulated into Ethernet frames, and those Ethernet frames may eventually be sent out as a collection of signal-encoded bits to the intermediate device. Depending on the network layer at which the device operates, the intermediate node 1010 may examine or, and in some cases reconstruct, the original frames, packets, and/or segment before routing that data to the second node 1010. Or, the intermediate node 1010 may simply examine the frames, or in some cases the packets as well, and route the data to the second node 1010 without ever examining the original segment (or, in some cases, the packet).

Data units of the network layer at which a node 1010 operates are considered protocol data units ("PDUs"), such as, without limitation, IP packets for the network layer (layer 3), frames for the Ethernet layer (layer 2), etc. A PDU may, for data unit handling purposes both within and without the device, be broken up into smaller subunits, or portions. The node 1010 need not necessarily ever assemble the data in a PDU together, but rather may in an embodiment act upon constituent portions of the PDU, which may be linked together by identifiers, linked lists, or other suitable constructs. Within a node itself, these portions are referred to herein as transport data units ("TDUs"). For instance, if the PDU is a packet, the TDU might be one or more cells. The first TDU in a PDU is referred to as the start-of-packet ("SOP"), while the last TDU in the PDU is referred to as the end-of-packet ("EOP").

Generally speaking, the TDU is the largest contiguous unit of data that certain internal components of a node 1010 are configured to communicate between each other in a given period of time. For instance, a node 1010 may have a traffic manager that is capable of receiving no more than a single TDU from each input interface it is connected to during a single clock cycle of the traffic manager. Additionally, though not necessarily the case in all embodiments, in at least some embodiments, the contiguous portions of data sent by each port of a node 1010 in a given period of time may be no larger than a TDU. In an embodiment, each TDU is of a fixed size, except for the last TDU in a PDU, which may be of a size less than the fixed size. In some embodiments, for physical storage purposes, a TDU may further be divided into chunks referred to as storage data units ("SDUs").

In an embodiment, TDU and SDU boundaries may be relative to the component acting upon the data. That is, for example, a node 1010 whose traffic manager is configured to use TDUs of a first size and SDUs of a second size may further include other components configured to communicate or buffer data units of sizes other than the first size and the second size.

For convenience, many of the techniques described in this disclosure are described with respect to embodiments where the PDUs are IP packets in a L3 (level 3) network, and the TDUs are constituent cells and/or frames thereof in an L2 (level 2) network, in which contexts the described techniques have particular advantages. It will be recognized, however, that these techniques may also be applied to realize advantages in handling other types of data units conforming to other protocols and/or at other communication layers within a network. Thus, unless otherwise stated or apparent, the techniques described herein should also be understood to apply to contexts in which the PDUs, TDUs, and SDUs are of any other types of data structures, such as segments, InfiniBand Messages, or datagrams. That is, in these contexts, other types of data structures may be used in place of packets, cells, frames, and so forth.

4.3. Network Paths

Any node in the depicted network 1000 may communicate with any other node in the network 1000 by sending data units through a series of nodes 1010 and links, referred to as a path. For example, Node B (1010*b*) may send data units to Node H (1010*h*) via a path from Node B to Node D to Node E to Node H. There may be a large number of valid paths between two nodes. For example, another path from Node B to Node H is from Node B to Node D to Node G to Node H.

In an embodiment, a node 1010 does not actually need to specify a full path for a data unit that it sends. Rather, the node 1010 may simply be configured to calculate the best path for the data unit out of the device (e.g. which egress port it should send the data unit out on). When a node 1010 receives a data unit that is not addressed directly to the node 1010, based on header information associated with a data unit, such as path and/or destination information, the node 1010 relays the data unit along to either the destination node 1010, or a "next hop" node 1010 that the node 1010 calculates is in a better position to relay the data unit to the destination node 1010. In this manner, the actual path of a data unit is the product of each node 1010 along the path making routing decisions about how best to move the data unit along to the destination node 1010 identified by the data unit.

4.4. Network Device

Figure 11:
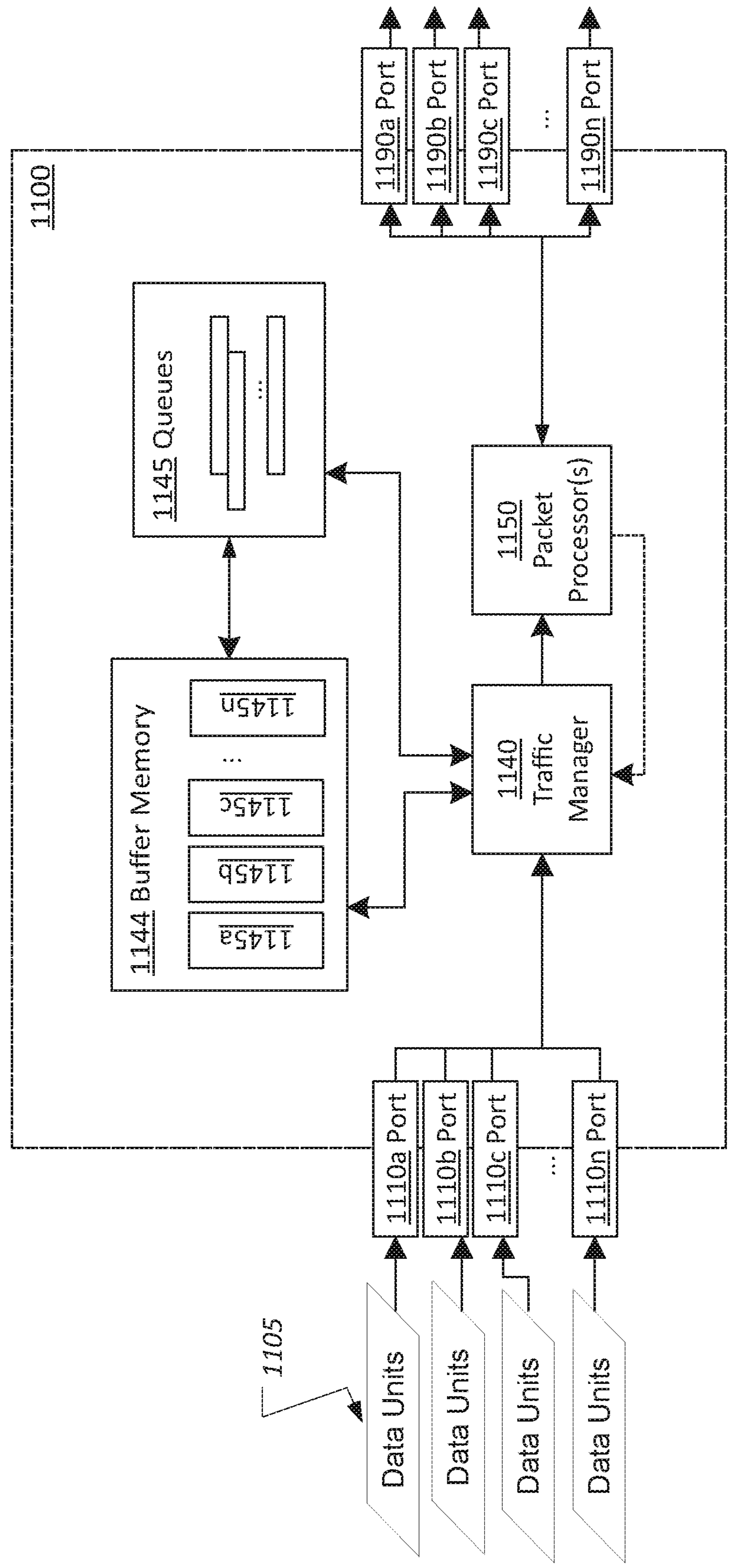
FIG. 11 is an illustrative view of various aspects of an example network device in which techniques described herein may be practiced.

FIG. 11 is an illustrative view of various aspects of an example network device 1100 in which techniques described herein may be practiced, according to an embodiment. Network device 1100 is a computing device comprising any combination of hardware and software configured to implement packet-switching logic using the various logical components described herein, including components 1110-1190. For example, the apparatus may be a single networking computing device, such as a router or switch, in which some or all of the components 1110-1190 described herein are implemented using application-specific integrated circuits (ASICs) or field programmable gate arrays (FPGAs). As another example, an implementing apparatus may include one or more memories storing instructions for implementing various components described herein, one or more hardware processors configured to execute the instructions stored in the one or more memories, and various data repositories in the one or more memories for storing data structures utilized and manipulated by various components 1110-1190.

Device 1100 is generally configured to receive data units 1105 and forward the data units 1105 to other devices in a network, such as network 1000, by means of a series of operations performed at various components within the device 1100. Note that certain nodes 1010 in system such as network 1000 may each be or include a separate network device 1100. In an embodiment, a node 1010 may include more than one device 1100. In an embodiment, device 1100 may itself be one of a number of components within a node 1010. For instance, network device 1100 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip.

A non-limiting example flow of a data unit 1105 through possible subcomponents of the packet-switching logic of device 1100 is as follows. After being received via a port 1110, a data unit 1105 may be buffered by an arbiter until the data unit 1105 can be processed by an ingress packet processor 1150, and then delivered to an interconnect. From the interconnect, the data unit 1105 may be forwarded to a traffic manager 1140. The traffic manager 1140 may store the data unit 1105 in a buffer 1144 and assign the data unit 1105 to a queue 1145. The traffic manager 1140 manages the flow of the data unit 1105 through the queue 1145 until the data unit 1105 is released to an egress packet processor 1150. Depending on the processing, the traffic manager 1140 may then assign the data unit 1105 to another queue 1145 so that it may be processed by yet another egress processor 1150, or the egress packet processor 1150 may send the data unit 1105 to an egress arbiter (not depicted) from which the data unit 1105 is finally forwarded out another port 1190. Of course, depending on the embodiment, the switching logic may omit some of these subcomponents and/or include other subcomponents in varying arrangements.

Example components of a device 1100 are now described in further detail.

4.5. Ports

Network device 1100 includes ports 1110/1190, by which the packet-handling logic is coupled to various network interfaces that receive and transmit data units 1105. Ports 1110, including ports 1110*a-n*, are inbound ("ingress") ports by which data units 1105 are received over a network, such as network 1000. Ports 1190, including ports 1190*a-n*, are outbound ("egress") ports by which at least some of the data units 1105 are sent out to other destinations within the network, after having been processed by the network device 1100.

Data units 1105 may be of any suitable PDU type, such as packets, cells, frames, etc. In an embodiment, data units 1105 are packets. However, the individual atomic data units upon which the depicted components operate may actually be subunits of the data units 1105. For example, at the port level, data units 1105 may be received, acted upon, and even transmitted as cells or other TDUs. These TDUs may be logically linked together as the data units 1105 (e.g. PDUs) to which they respectively belong for purposes of determining how to handle the cells or frames. However, the subunits may not actually be assembled into data units 1105 within device 1100, particularly if the subunits are being forwarded to another destination through device 1100.

Ports 1110/1190 are depicted as separate ports for illustrative purposes, but may actually correspond to the same physical interface hardware on the network device 1110. That is, a network device 1100 may both receive data units 1105 and send data units 1105 over a single physical interface, and the single physical interface may thus be logically coupled to both an ingress port 1110 and egress port 1190. Nonetheless, for various functional purposes, certain logic of the network device 1100 may view a single physical interface as a separate ingress port 1110 and egress port 1190. Moreover, for various functional purposes, certain logic of the network device 1100 may subdivide a single physical interface into multiple ingress ports 1110 or egress ports 1190, or aggregate multiple physical interfaces into a single ingress port 1110 or egress port 1190. Hence, in various embodiments, ports 1110 and 1190 should be understood as distinct logical constructs that are can be mapped to physical interfaces rather than simply as distinct physical constructs.

In some embodiments, the physical interfaces to which the ports 1110/1190 of a device 1100 are coupled may include various interface components from a MAC layer and/or Physical layer, including one or more transceivers, Serializer/Deserializer ("SerDes") blocks, interface controllers, and/or other suitable components, by which device 1100 receives, decodes, descrambles, deserializes, encodes, scrambles, serializes, sends, and/or otherwise processes data units on their way in or out of ports 1110/1190.

4.6. Packet Processors

A device 1100 comprises one or more packet processing components 1150. These packet processors 1150 may be any suitable combination of fixed circuitry and/or software-based logic, such as specific logic components implemented by one or more Field Programmable Gate Arrays (FPGAs) or Application-Specific Integrated Circuits (ASICs), or a general-purpose processor executing software instructions.

Different packet processors 1150 may be configured to perform different packet processing tasks. These tasks may include, for example, identifying paths along which to forward data units 1105, forwarding data units 1105 to egress ports 1190, implementing flow control and/or other policies, manipulating packets, performing statistical or debugging operations, and so forth. A device 1100 may comprise any number of packet processors 1150 configured to perform any number of processing tasks.

In an embodiment, the packet processors 1150 within a device 1100 may be arranged such that the output of one packet processor 1150 may, eventually, be inputted into another packet processor 1150, in such a manner as to pass data units 1105 from certain packet processor(s) 1150 to other packet processor(s) 1150 in a sequence of stages, until finally disposing of the data units 1105 (e.g. by sending the data units 1105 out an egress port 1190, "dropping" the data units 1105, etc.). The exact set and/or sequence of packet processors 1150 that process a given data unit 1105 may vary, in some embodiments, depending on attributes of the data unit 1105 and/or the state of the device 1100. Any number of packet processors 1150 may be chained together in this manner.

Based on decisions made while processing a data unit 1105, a packet processor 1150 may, in some embodiments, and/or for certain processing tasks, manipulate a data unit 1105 directly. For instance, the packet processor 1150 may add, delete, or modify information in a data unit header or payload. In other embodiments, and/or for other processing tasks, a packet processor 1150 may generate control information that accompanies the data unit 1105, or is merged with the data unit 1105, as the data unit 1105 continues through the device 1100. This control information may then be utilized by other components of the device 1100 to implement decisions made by the packet processor 1150.

In an embodiment, a packet processor 1150 need not necessarily process an entire data unit 1105, but may rather only receive and process a subunit of a data unit 1105, such as a TDU comprising header information for the data unit. For instance, if the data unit 1105 is a packet comprising multiple cells, the first cell, or a first subset of cells, might be forwarded to a packet processor 1150, while the remaining cells of the packet (and potentially the first cell(s) as well) are forwarded in parallel to a merger component where they await results of the processing.

Ingress and Egress Processors

In an embodiment, a packet processor may be generally classified as an ingress packet processor 1150 or an egress packet processor 1150. Generally, an ingress processor 1150 resolves destinations for a traffic manager 1140 to determine which ports 1190 and/or queues 1145 a data unit 1105 should depart from. There may be any number of ingress processors 1150, including just a single ingress processor 1150.

In an embodiment, an ingress processor 1150 performs certain intake tasks on data units 1105 as they arrive. These intake tasks may include, for instance, and without limitation, parsing data units 1105, performing routing related lookup operations, categorically blocking data units 1105 with certain attributes and/or when the device 1100 is in a certain state, duplicating certain types of data units 1105, making initial categorizations of data units 1105, and so forth. Once the appropriate intake task(s) have been performed, the data units 1105 are forwarded to an appropriate traffic manager 1140, to which the ingress processor 1150 may be coupled directly or via various other components, such as an interconnect component.

The egress packet processor(s) 1150 of a device 1100, by contrast, may be configured to perform non-intake tasks necessary to implement the switching logic of the device 1100. These tasks may include, for example, tasks such as identifying paths along which to forward the data units 1105, implementing flow control and/or other policies, manipulating data units, performing statistical or debugging operations, and so forth. In an embodiment, there may be different egress packet processors(s) 1150 assigned to different flows or other categories of traffic, such that not all data units 1105 will be processed by the same egress packet processor 1150.

In an Embodiment, Each Egress Processor 1150 is Coupled to a Different Group of egress ports 1190 to which they may send data units 1105 processed by the egress processor 1150. In an embodiment, access to a group of ports 1190 may be regulated via an egress arbiter coupled to the egress packet processor 1150. In some embodiments, an egress processor 1150 may also or instead be coupled to other potential destinations, such as an internal central processing unit, a storage subsystem, or a traffic manager 1140.

4.7. Buffers

Since not all data units 1105 received by the device 1100 can be processed by the packet processor(s) 1150 at the same time, various components of device 1100 may temporarily store data units 1105 in one or more buffers 1144 while the data units 1105 are waiting to be processed. For example, a certain packet processor 1150 may only be capable of processing a certain number of data units 1105, or portions of data units 1105, in a given clock cycle, meaning that other data units 1105, or portions of data units 1105, destined for the packet processor 1150 must either be ignored (i.e. dropped) or stored. At any given time, a large number of data units 1105 may be stored in the buffers 1144 of the device 1100, depending on network traffic conditions.

A device 1100 may include a variety of buffers 1144, each utilized for varying purposes and/or components. Generally, a data unit 1105 awaiting processing by a component is held in a buffer 1144 associated with that component until the data unit 1105 is "released" to the component for processing. For example, a traffic manager 1140 will typically have a relatively large buffer 1144, referred to as an egress buffer, in which it buffers data units 1105 prior to releasing those data units 1150 to an egress packet processor 1150.

A buffer 1144 may be implemented using a single physical memory unit (e.g. SRAM, DRAM, etc.), a designated portion of a memory unit, or a collection of memory units, depending on an embodiment. The buffer 1144 is divided into addressable units, or entries, that store SDUs, one or more of which form a TDU, as explained elsewhere. Each TDU stored in a buffer 1144 belongs to a PDU. However, the data for the TDUs that belong to a PDU may not necessarily be stored adjacent to each other. If one wishes to reconstruct a PDU based on the buffered SDUs, one might be unable to do so using the TDU buffer memory alone. Therefore, in an embodiment, buffer 1144 may further store or be associated with linking data that indicates which SDUs belong to a given TDU and/or which TDUs belong to a given PDU, also referred to as intra-packet link data.

For each PDU, buffer space 1144 may further store or be associated with various PDU metadata. The PDU metadata may include any suitable information about a PDU, such as a PDU identifier, location(s) of linking data for the PDU (e.g. the address(es) of intra-packet entr(ies) at which the linked list(s) for the PDU start), a count of TDUs in the PDU, source information, destination information, control information, timestamps, statistics, an assigned queue, flow control information, and so forth.

4.8. Queues

In an embodiment, to manage the order in which data units 1105 are processed from buffers 1144, various components of a device 1100 may implement queueing logic. For example, the flow of data units 1105 through the egress buffers 1144 of traffic manager 1140 may be managed using egress queues while the flow of data units 1105 through the buffers of an ingress arbiter might be managed using ingress queues.

A queue 1145 is a set of nodes arranged in some order by metadata describing the queue 1145. The queue 1145 includes a head node, or head, which is typically the next node to be processed, and a tail node, or tail, which is typically the node most recently added to the queue. A node will typically progress from the tail to the head over time as other nodes are processed and removed from the queue.

In the case of queue 1145, the nodes are data unit 1105, or the buffer locations(s) at which the data unit 1105 begins. A data unit 1105 that has been added to a queue 1145 is said to be "linked" to that queue 1145. A data unit 1105 may belong to one or more queues 1145.

In many embodiments, the sequence in which the queue 1145 arranges its constituent data units 1105 generally corresponds to the order in which the data units 1105 or data unit portions in the queue 1145 will be released and processed. Such queues 1145 are known as first-in-first-out ("FIFO") queues, though in other embodiments other types of queues may be utilized. In some embodiments, the number of data units 1105 or data unit portions assigned to a given queue 1145 at a given time may be limited, either globally or on a per-queue basis, and this limit may change over time.

In an embodiment, queues 1145 are implemented using a linking memory referred to an "inter-packet" link memory, which is separate from the associated buffer memory 1144. Each entry in the link memory is said to be a node in the queue. Each link entry points comprises a data pointer, which, when the link entry is occupied, points to a memory location in the buffer memory 1144 at which a corresponding data unit (or at least the start of the data unit) is found (e.g. a buffer entry, a first entry for the data unit in an intra-packet link memory, etc.). Each entry in the link memory further may further comprises a link pointer to another link entry, which corresponds to the next node in the queue. Of course, in other embodiments, other types of linking memories and/or other structures may instead be utilized instead to represent the queue.

4.9. Traffic Management

According to an embodiment, a device 1100 further includes one or more traffic managers 1140 configured to control the flow of data units 1105 to one or more packet processor(s) 1150. A traffic manager 1140 may receive data units 1105 directly from a port 1110, from an ingress processor 1150, and/or other suitable components of device 1100. In an embodiment, the traffic manager 1140 is configured to receive up to one TDU from each possible source (e.g. each port 1110) each clock cycle of the traffic manager 1140.

Traffic manager 1140 may include or be coupled to buffers 1144 for buffering data units 1105 prior to sending those data units 1105 to their respective processor(s) 1150. A buffer manager within the traffic manager 1140 may temporarily store data units 1105 in buffers 1144 as they await processing by processor(s) 1150. A data unit 1105 or data unit portion in a buffer 1144 may eventually be "released" to one or more processor(s) 1150 for processing, by reading the data unit 1105 from the buffer 1144 and sending the data unit 1105 to the processor(s) 1150. In an embodiment, traffic manager 1140 may release up to a certain number of data units 1105 from buffers 1144 to processors 1150 each clock cycle.

Beyond managing the use of buffers 1144 to store data units 1105 (or copies thereof), a traffic manager 1140 may include queue management logic configured to assign data units 1105 to queues 1145 and manage the flow of data units 1105 through queues 1145. The traffic manager 1140 may, for instance, "enqueue" a PDU that has been fully buffered by identifying a specific queue 1145 to assign the PDU to, and then linking a PDU identifier or other PDU metadata to the assigned queue. The traffic manager 1140 may further determine when to release—also referred to as dequeuing—data units 1105 from queues 1145 by sending instructions to the buffer manager 1144 read/release the data units 1105 and then providing the data read from the buffer 1144 to specific packet processor(s) 1150.

In an embodiment, different queues 1145 may exist for different sources or destinations. For example, each port 1110 and/or port 1190 may have its own set of queues 1145. The queue 1145 to which an incoming data unit 1105 is assigned and linked may, for instance, be selected based on forwarding information indicating which port 1190 the data unit 1105 should depart from. In an embodiment, a different egress processor 1150 may be associated with each different set of one or more queues 1145. In an embodiment, the current processing context of the data unit 1105 may be used to select which queue 1145 a data unit 1105 should be assigned to.

In an embodiment, there may also or instead be different queues 1145 for different flows or sets of flows. That is, each identifiable traffic flow or group of traffic flows is assigned its own set of queues 1145 to which its data units 1105 are respectively assigned. In an embodiment, different queues 1145 may correspond to different classes of traffic or quality-of-service (QoS) levels. Different queues 1145 may also or instead exist for any other suitable distinguishing properties of the data units 1105, such as source address, destination address, packet type, and so forth.

Though only one packet processor 1150 and traffic manager 1140 are depicted, a device 1100 may comprise any number of packet processors 1150 and traffic managers 1140. For instance, different sets of ports 1110 and/or ports 1190 may have their own traffic manager 1140 and packet processors 1150. As another example, in an embodiment, the traffic manager 1140 may be duplicated for some or all of the stages of processing a data unit. For example, system 1100 may include a traffic manager 1140 and egress packet processor 1150 for an egress stage performed upon the data unit 1105 exiting the system 1100, and/or a traffic manager 1140 and packet processor 1150 for any number of intermediate stages. The data unit 1105 may thus pass through any number of traffic managers 1140 and/or packet processors 1150 prior to exiting the system 1100. In other embodiments, only a single traffic manager 1140 is needed. If intermediate processing is needed, flow of a data unit 1105 may loop back to the traffic manager 1140 for buffering and/or queuing after each stage of intermediate processing.

In an embodiment, a traffic manager 1140 is coupled to the output of an ingress packet processor(s) 1150, such that data units 1105 (or portions thereof) are assigned to buffers 1144 only upon being initially processed by an ingress packet processor 1150. Once in an egress buffer 1144, a data unit 1105 (or portion thereof) may be "released" to one or more egress packet processor(s) 1150 for processing.

In the course of processing a data unit 1105, a device 1100 may replicate a data unit 1105 one or more times for purposes such as, without limitation, multicasting, mirroring, debugging, and so forth. For example, a single data unit 1105 may be replicated to multiple egress queues 1145. For instance, a data unit 1105 may be linked to separate queues 1145 for each of ports 1, 3, and 8. As another example, a data unit 1105 may be replicated a number of times after it reaches the head of a queue 1145 (e.g. for different egress processors 1150). Hence, though certain techniques described herein may refer to the original data unit 1105 that was received by the device 1100, it will be understood that those techniques will equally apply to copies of the data unit 1105 that have been generated for various purposes. A copy of a data unit 1105 may be partial or complete. Moreover, there may be an actual physical copy of the data unit 1105 in buffers 1144, or a single copy of the data unit 1105 may be linked from a single buffer location to multiple queues 1145 at the same time.

4.10. Forwarding Logic

The logic by which a device 1100 determines how to handle a data unit 1105—such as where and whether to send a data unit 1105, whether to perform additional processing on a data unit 1105, etc.—is referred to as the forwarding logic of the device 1100. This forwarding logic is collectively implemented by a variety of the components of the device 1100, such as described elsewhere herein. For example, an ingress packet processor 1150 may be responsible for resolving the destination of a data unit 1105 and determining the set of actions/edits to perform on the data unit 1105, and an egress packet processor 1150 may perform the edits. Also, there may be embodiments when the ingress packet processor 1150 performs edits as well.

The forwarding logic may be hard-coded and/or configurable, depending on the embodiment. For example, the forwarding logic of a device 1100, or portions thereof, may, in some instances, be at least partially hard-coded into one or more ingress processors 1150 and/or egress processors 1150. As another example, the forwarding logic, or elements thereof, may also be configurable, in that the logic changes over time in response to analyses of state information collected from, or instructions received from, the various components of the device 1100 and/or other nodes in the network in which the device 1100 is located.

In an embodiment, a device 1100 will typically store in its memories one or more forwarding tables (or equivalent structures) that map certain data unit attributes or characteristics to actions to be taken with respect to data units 1105 having those attributes or characteristics, such as sending a data unit 1105 to a selected path, or processing the data unit 1105 using a specified internal component. For instance, such attributes or characteristics may include a Quality-of-Service level specified by the data unit 1105 or associated with another characteristic of the data unit 1105, a flow control group, an ingress port 1110 through which the data unit 1105 was received, a tag or label in a packet's header, a source address, a destination address, a packet type, or any other suitable distinguishing property. The forwarding logic, for example, read such a table, determine one or more ports 1190 to send a data unit 1105 to based on the table, and add or associate the data unit 1105 with information that indicates to downstream logic to send the data unit 1105 along a path that includes a specific traffic manager 1140 and/or egress processor 1150 that is coupled to the one or more ports 1190.

According to an embodiment, the forwarding tables describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g. are directed to) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

In an embodiment, forwarding logic may read port state data for ports 1110/690. Port state data may include, for instance, flow control state information describing various traffic flows and associated traffic flow control rules or policies, link status information indicating links that are up or down, port utilization information indicating how ports are being utilized (e.g. utilization percentages, utilization states, etc.). Forwarding logic may be configured to implement the associated rules or policies associated with the flow(s) to which a given packet belongs.

As data units 1105 are routed through different nodes in a network, the nodes may, on occasion, discard, fail to send, or fail to receive certain data units 1105, thus resulting in the data units 1105 failing to reach their intended destination. The act of discarding of a data unit 1105, or failing to deliver a data unit 1105, is typically referred to as "dropping" the data unit. Instances of dropping a data unit 1105, referred to herein as "drops" or "packet loss," may occur for a variety of reasons, such as resource limitations, errors, or deliberate policies. Different components of a device 1100 may make the decision to drop a data unit 1105 for various reasons. For instance, a traffic manager 1140 may determine to drop a data unit 1105 because, among other reasons, buffers 1144 are overutilized, a queue 1145 is over a certain size, and/or a data unit 1105 has a certain characteristic.

4.11. Miscellaneous

Device 200 illustrates only one of many possible arrangements of components in a network device configured to provide the functionality described herein. Other arrangements may include fewer, additional, or different components, and the division of work between the components may vary depending on the arrangement. Moreover, in an embodiment, the techniques described herein may be utilized in a variety of computing contexts other than within a network 500.

For simplification, the traffic managers, packet processors, and other components are on occasion described herein as acting upon or with respect to a data unit, when in fact only a portion of the data unit may be sent to or otherwise available to the component. For instance, a packet processor may be said to process a data unit, when in fact only the data unit control portion is available to the packet processor. In such contexts, it will be understood that the information about the data unit that is actually available to the component is a representation of the data unit to that component. Any actions described herein as having been taken by the component on or with respect to the data unit may occur with respect to the representation of the data unit, and not necessarily the complete data unit.

It will be appreciated that the actual physical representation of a data unit may change as a result of the processes described herein. For instance, a data unit may be converted from a physical representation at a particular location in one memory to a signal-based representation, and back to a physical representation at a different location in a potentially different memory, as it is moved from one component to another within a network device or even between network devices. Such movement may technically involve deleting, converting, and/or copying some or all of the data unit any number of times. For simplification, however, the data unit is logically said to remain the same data unit as it moves through the device, even if the physical representation of the data unit changes. Similarly, the contents and/or structure of a data unit may change as it is processed, such as by adding or deleting header information, adjusting cell boundaries, or even modifying payload data. A modified data unit is nonetheless still said to be the same data unit, even after altering its contents and/or structure.

5.0. EXAMPLE EMBODIMENTS

Examples of some embodiments are represented, without limitation, as follows:

According to an embodiment, a networking apparatus comprises: a plurality of communication interfaces configured to receive and send data over one or more networks; packet-switching logic configured to determine how to process data units, including forwarding at least some of the data units to other network devices via the plurality of communication interfaces; one or more buffer memories configured to store the data units while the data units await processing by the packet-switching logic; queueing logic configured to utilize a plurality of queues to manage an order in which the buffered data units are processed by the packet-switching logic; delay-tracking logic configured to calculate delay measures associated with the queues based on arrival timestamps associated with at least certain data units in the queues; policy management logic configured to determine one or more policies to apply to particular data units assigned to particular queues based on particular queue delay measures calculated for the particular queues; wherein the packet-switching logic is further configured to implement the determined one or more policies by performing one or more actions indicated by the one or more policies on at least a subset of the particular data units.

In an embodiment, the one or more policies include a tail drop policy applicable to a first queue when a first queue delay measure calculated for the first queue exceeds a tail drop threshold; and the packet-switching logic is further configured to, while the tail drop policy is applied to the first queue, discard all data units assigned to the first queue before the data units assigned to the first queue can be enqueued by the queuing logic.

In an embodiment, the one or more policies include a weighted-random early detection ("WRED") policy for a first queue; the policy management logic is further configured to select a first frequency with which the packet-switching logic is to discard data units assigned to the first queue based on a WRED curve and a first delay measure calculated for the first queue; and the packet-switching logic is further configured to discard first data units assigned to the first queue before the first data units can be enqueued by the queuing logic, the first data units selected based on the first frequency.

In an embodiment, the one or more policies include a congestion notification policy for a first queue; the policy management logic is further configured to select a first frequency with which the packet-switching logic is to mark data units assigned to the first queue based on a first delay measure calculated for the first queue; and the packet-switching logic is further configured to, when first data units are dequeued from the first queue, mark the first data units with a congestion notification, the first data units selected based on the first frequency.

In an embodiment, the one or more policies include a reflection policy for a first queue; the policy management logic is further configured to select a first frequency with which the packet-switching logic is to reflect data units assigned to the first queue based on a first delay measure calculated for the first queue; and the packet-switching logic is further configured to, when first data units are enqueued to the first queue, copy the first data units and send the copies of the first data units back to a sender of the first data units with state information of the apparatus, the first data units selected based on the first frequency.

In an embodiment, the policy management logic is further configured to: calculate a congestion score for a first queue based on a function of at least a first delay measure associated with the first queue and a size of the first queue; and determine a first policy to apply to the first queue based on the congestion score.

In an embodiment, the packet-switching logic is further configured to determine whether a given data unit is in the subset of the particular data units with respect to which the one or more actions are performed by generating a random number and comparing the random number to a probability associated with a given policy that the policy management logic determined to be applicable to the given data unit, the probability having been determined based on a given queue delay measure associated with a given queue to which the given data unit was assigned.

In an embodiment, the packet-switching logic is further configured to determine whether a given data unit is in the subset of the particular data units with respect to which the one or more actions are performed based on a counter associated with a given policy that the policy management logic determined to be applicable to the given data unit, a size of the counter having been determined based on a given queue delay measure associated with a given queue to which the given data unit was assigned.

In an embodiment, the one or more actions include at least one of: discarding a data unit, marking a data unit, or reflecting a data unit back to a sender.

In an embodiment, the policy management logic is further configured to determine a given policy to apply to a given data unit at least partially based on a particular attribute associated with the given data unit in addition to a given queue delay calculated for a given queue to which the given data unit was assigned.

In an embodiment, the delay-tracking logic is further configured to calculate a delay measure for a given queue by subtracting an arrival timestamp of a data unit at the head of the queue from a current time, the calculating occurring in response to one or more of: dequeuing the data unit at the head of the queue, assigning a new data unit to the queue, or lapsing of a certain amount of time since the delay measure was last calculated.

In an embodiment, the delay-tracking logic is further configured to: only retain arrival timestamps for the certain data units; and calculate a delay measure for a given queue by subtracting the oldest retained arrival timestamp of any data unit in the queue from a current time, the calculating occurring in response to one or more of: dequeuing a data unit at the head of the queue, assigning a new data unit to the queue, or lapsing of a certain amount of time since the delay measure was last calculated.

According to an embodiment, a method comprises: receiving data units in a network device; storing data units in one or more buffer memories while the data units await processing by packet-switching logic of the network device; utilizing a plurality of queues to manage an order in which the buffered data units are processed by the packet-switching logic; calculating a delay measure associated with at least a particular queue of the queues based on an arrival timestamp associated with at least a certain data unit in the particular queue; determining one or more policies to apply to particular data units assigned to the particular queue based on the delay measure; performing one or more actions indicated by the one or more policies on at least a subset of the particular data units; and forwarding at least some of the particular data units to other network devices via a plurality of communication interfaces of the network device.

In an embodiment, the one or more policies include a tail drop policy that is applicable when the queue delay measure exceeds a tail drop threshold, the method further comprising: while the tail drop policy is applicable to the particular queue, discarding all data units assigned to the particular queue instead of enqueueing the data units in the particular queue.

In an embodiment, the one or more policies include a weighted-random early detection ("WRED") policy, the method further comprising: selecting a particular frequency with which to discard data units assigned to the particular queue based on a WRED curve and the delay measure; discarding first data units assigned to the particular queue instead of enqueuing the first data units in the particular queue, the first data units selected based on the particular frequency.

In an embodiment, the one or more policies include a congestion notification policy, the method further comprising: selecting a particular frequency with which to mark data units assigned to the particular queue based on the delay measure; and when first data units are dequeued from the first queue, marking the first data units with a congestion notification, the first data units selected based on the particular frequency.

In an embodiment, the one or more policies include a reflection policy, the method further comprising: selecting a particular frequency with which to reflect data units assigned to the particular queue based on the delay measure; when first data units are enqueued to the particular queue, copying the first data units and sending the copies of the first data units back to a sender of the first data units with state information of the network device, the first data units selected based on the particular frequency.

In an embodiment, the method further comprises: calculating a congestion score based on a function of at least the delay measure and a size of the particular queue; wherein determining the one or more policies to apply based on the delay measure is based on the congestion score.

Yet other example embodiments are described in other sections herein.

6.0. IMPLEMENTATION MECHANISM—HARDWARE OVERVIEW

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 12:
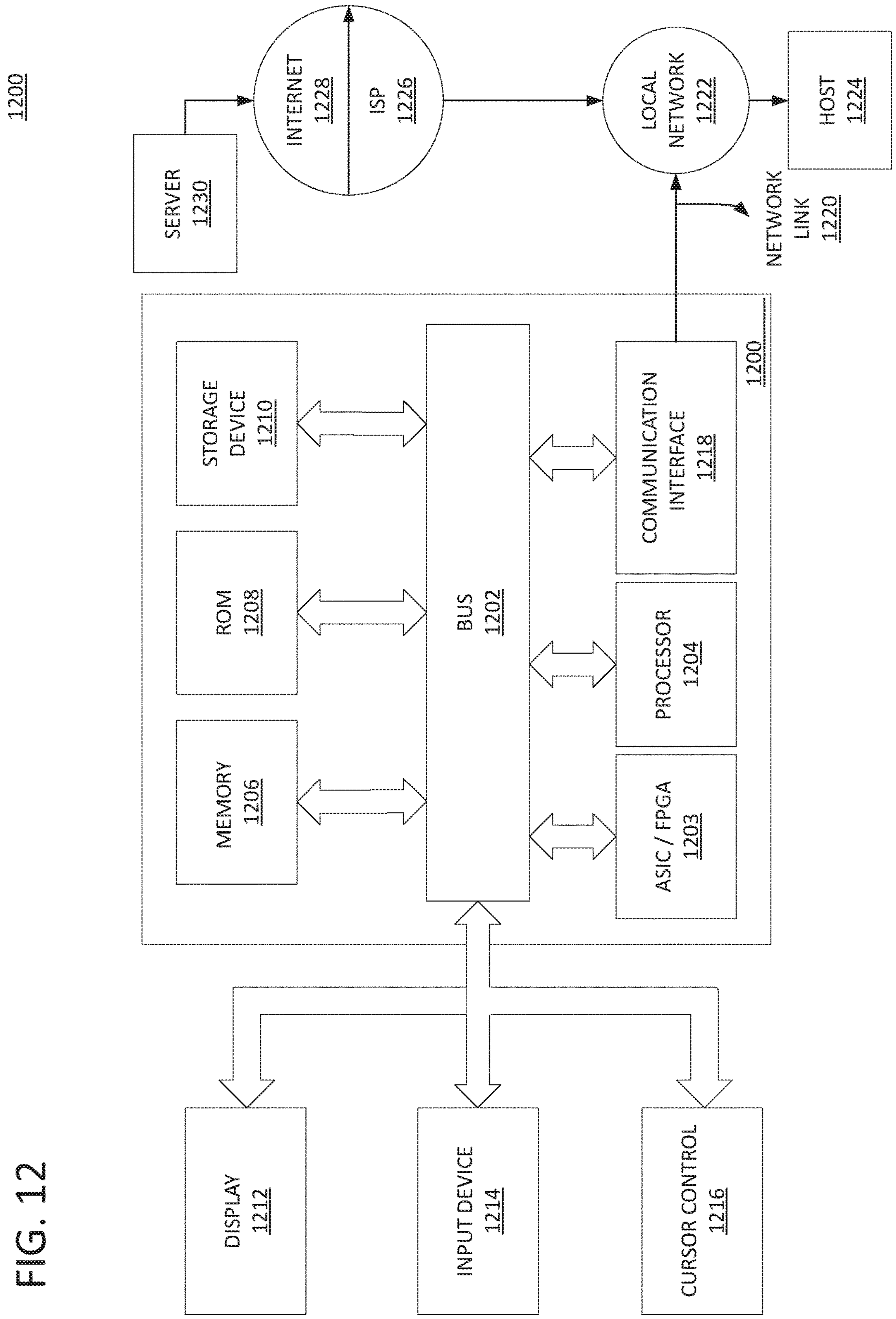
FIG. 12 is a block diagram that illustrates an example computer system that may be utilized in implementing the above-described techniques.

FIG. 12 is a block diagram that illustrates an example computer system 1200 that may be utilized in implementing the above-described techniques, according to an embodiment. Computer system 1200 may be, for example, a desktop computing device, laptop computing device, tablet, smartphone, server appliance, computing mainframe, multimedia device, handheld device, networking apparatus, or any other suitable device. In an embodiment, FIG. 12 constitutes a different view of the devices and systems described in previous sections.

Computer system 1200 may include one or more ASICs, FPGAs, or other specialized circuitry 1203 for implementing program logic as described herein. For example, circuitry 1203 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 1200 may include one or more hardware processors 1204 configured to execute software-based instructions. Computer system 1200 may also include one or more busses 1202 or other communication mechanism for communicating information. Busses 1202 may include various internal and/or external components, including, without limitation, internal processor or memory busses, a Serial ATA bus, a PCI Express bus, a Universal Serial Bus, a HyperTransport bus, an InfiniBand bus, and/or any other suitable wired or wireless communication channel.

Computer system 1200 also includes one or more memories 1206, such as a RAM, hardware registers, or other dynamic or volatile storage device for storing data units to be processed by the one or more ASICs, FPGAs, or other specialized circuitry 1203. Memory 1206 may also or instead be used for storing information and instructions to be executed by processor 1204. Memory 1206 may be directly connected or embedded within circuitry 1203 or a processor 1204. Or, memory 1206 may be coupled to and accessed via bus 1202. Memory 1206 also may be used for storing temporary variables, data units describing rules or policies, or other intermediate information during execution of program logic or instructions.

Computer system 1200 further includes one or more read only memories (ROM) 1208 or other static storage devices coupled to bus 1202 for storing static information and instructions for processor 1204. One or more storage devices 1210, such as a solid-state drive (SSD), magnetic disk, optical disk, or other suitable non-volatile storage device, may optionally be provided and coupled to bus 1202 for storing information and instructions.

A computer system 1200 may also include, in an embodiment, one or more communication interfaces 1218 coupled to bus 1202. A communication interface 1218 provides a data communication coupling, typically two-way, to a network link 1220 that is connected to a local network 1222. For example, a communication interface 1218 may be an integrated services digital network (ISDN) card, cable modem, satellite modem, or a modem to provide a data communication connection to a corresponding type of telephone line. As another example, the one or more communication interfaces 1218 may include a local area network (LAN) card to provide a data communication connection to a compatible LAN. As yet another example, the one or more communication interfaces 1218 may include a wireless network interface controller, such as an 1202.11-based controller, Bluetooth controller, Long Term Evolution (LTE) modem, and/or other types of wireless interfaces. In any such implementation, communication interface 1218 sends and receives electrical, electromagnetic, or optical signals that carry digital data streams representing various types of information.

Network link 1220 typically provides data communication through one or more networks to other data devices. For example, network link 1220 may provide a connection through local network 1222 to a host computer 1224 or to data equipment operated by a Service Provider 1226. Service Provider 1226, which may for example be an Internet Service Provider (ISP), in turn provides data communication services through a wide area network, such as the worldwide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

In an embodiment, computer system 1200 may send and receive data units through the network(s), network link 1220, and communication interface 1218. In some embodiments, this data may be data units that the computer system 1200 has been asked to process and, if necessary, redirect to other computer systems via a suitable network link 1220. In other embodiments, this data may be instructions for implementing various processes related to the described techniques. For instance, in the Internet example, a server 1230 might transmit a requested code for an application program through Internet 1228, ISP 1226, local network 1222 and communication interface 1218. The received code may be executed by processor 1204 as it is received, and/or stored in storage device 1210, or other non-volatile storage for later execution. As another example, information received via a network link 1220 may be interpreted and/or processed by a software component of the computer system 1200, such as a web browser, application, or server, which in turn issues instructions based thereon to a processor 1204, possibly via an operating system and/or other intermediate layers of software components.

Computer system 1200 may optionally be coupled via bus 1202 to one or more displays 1212 for presenting information to a computer user. For instance, computer system 1200 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1212 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1212.

One or more input devices 1214 are optionally coupled to bus 1202 for communicating information and command selections to processor 1204. One example of an input device 1214 is a keyboard, including alphanumeric and other keys. Another type of user input device 1214 is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane. Yet other examples of suitable input devices 1214 include a touch-screen panel affixed to a display 1212, cameras, microphones, accelerometers, motion detectors, and/or other sensors. In an embodiment, a network-based input device 1214 may be utilized. In such an embodiment, user input and/or other information or commands may be relayed via routers and/or switches on a Local Area Network (LAN) or other suitable shared network, or via a peer-to-peer network, from the input device 1214 to a network link 1220 on the computer system 1200.

As discussed, computer system 1200 may implement techniques described herein using customized hard-wired logic, one or more ASICs or FPGAs 1203, firmware and/or program logic, which in combination with the computer system causes or programs computer system 1200 to be a special-purpose machine. According to one embodiment, however, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media may also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 1200 may receive the data on the network and demodulate the signal to decode the transmitted instructions. Appropriate circuitry may then place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

7.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A networking apparatus comprising:

a plurality of communication interfaces configured to receive and send data over one or more networks;

packet-switching logic configured to determine how to process data units, including forwarding at least some of the data units to other network devices via the plurality of communication interfaces;

one or more buffer memories configured to store the data units while the data units await processing by the packet-switching logic;

queueing logic configured to utilize a plurality of queues to manage an order in which the buffered data units are processed by the packet-switching logic;

delay-tracking logic configured to calculate delay measures associated with the queues based on arrival timestamps associated with at least certain data units in the queues, the delay-tracking logic calculates a delay measure for a given queue among the queues by subtracting an arrival timestamp of a data unit at the head of the queue from a current time, the calculation occurring in response to one or more of: dequeuing the data unit at the head of the queue, assigning a new data unit to the queue, or lapsing of a certain amount of time since the delay measure was last calculated;

policy management logic configured to determine one or more policies to apply to particular data units assigned to particular queues based on particular queue delay measures calculated for the particular queues;

wherein the packet-switching logic is further configured to implement the determined one or more policies by performing one or more actions indicated by the one or more policies on at least a subset of the particular data units;

wherein the one or more policies include a tail drop policy applicable to a first queue when a first queue delay measure calculated for the first queue exceeds a tail drop threshold;

wherein the packet-switching logic is further configured to, while the tail drop policy is applied to the first queue, discard all data units assigned to the first queue before the data units assigned to the first queue can be enqueued by the queuing logic.

2. The apparatus of claim 1, wherein the one or more policies include a weighted-random early detection ("WRED") policy for a first queue;

wherein the policy management logic is further configured to select a first frequency with which the packet-switching logic is to discard data units assigned to the first queue based on a WRED curve and a first delay measure calculated for the first queue;

wherein the packet-switching logic is further configured to discard first data units assigned to the first queue before the first data units can be enqueued by the queuing logic, the first data units selected based on the first frequency.

3. The apparatus of claim 1, wherein the one or more policies include a congestion notification policy for a first queue;

wherein the policy management logic is further configured to select a first frequency with which the packet-switching logic is to mark data units assigned to the first queue based on a first delay measure calculated for the first queue;

wherein the packet-switching logic is further configured to, when first data units are dequeued from the first queue, mark the first data units with a congestion notification, the first data units selected based on the first frequency.

4. The apparatus of claim 1, wherein the one or more policies include a reflection policy for a first queue;

wherein the policy management logic is further configured to select a first frequency with which the packet-switching logic is to reflect data units assigned to the first queue based on a first delay measure calculated for the first queue;

wherein the packet-switching logic is further configured to, when first data units are enqueued to the first queue, copy the first data units and send the copies of the first data units back to a sender of the first data units with state information of the apparatus, the first data units selected based on the first frequency.

5. The apparatus of claim 1, wherein the policy management logic is further configured to:

calculate a congestion score for a first queue based on a function of at least a first delay measure associated with the first queue and a size of the first queue; and determine a first policy to apply to the first queue based on the congestion score.

6. The apparatus of claim 1, wherein the packet-switching logic is further configured to determine whether a given data unit is in the subset of the particular data units with respect to which the one or more actions are performed by generating a random number and comparing the random number to a probability associated with a given policy that the policy management logic determined to be applicable to the given data unit, the probability having been determined based on a given queue delay measure associated with a given queue to which the given data unit was assigned.

7. The apparatus of claim 1, wherein the packet-switching logic is further configured to determine whether a given data unit is in the subset of the particular data units with respect to which the one or more actions are performed based on a counter associated with a given policy that the policy management logic determined to be applicable to the given data unit, a size of the counter having been determined based on a given queue delay measure associated with a given queue to which the given data unit was assigned.

8. The apparatus of claim 1, wherein the policy management logic is further configured to determine a given policy to apply to a given data unit at least partially based on a particular attribute associated with the given data unit in addition to a given queue delay calculated for a given queue to which the given data unit was assigned.

9. The apparatus of claim 1, wherein the delay-tracking logic is further configured to:

only retain arrival timestamps for the certain data units;

calculate a delay measure for a given queue by subtracting the oldest retained arrival timestamp of any data unit in the queue from a current time, the calculating occurring in response to one or more of: dequeuing a data unit at the head of the queue, assigning a new data unit to the queue, or lapsing of a certain amount of time since the delay measure was last calculated.

10. A method comprising:

receiving data units in a network device;

storing data units in one or more buffer memories while the data units await processing by packet-switching logic of the network device;

utilizing a plurality of queues to manage an order in which the buffered data units are processed by the packet-switching logic;

calculating a delay measure associated with at least a particular queue of the queues based on an arrival timestamp associated with at least a certain data unit in the particular queue, the delay measure for the particular queue is calculated by subtracting an arrival timestamp of a data unit at the head of the particular queue from a current time, the calculation occurring in response to one or more of:

dequeuing the data unit at the head of the particular queue, assigning a new data unit to the particular queue, or lapsing of a certain amount of time since the delay measure was last calculated;

determining one or more policies to apply to particular data units assigned to the particular queue based on the delay measure;

performing one or more actions indicated by the one or more policies on at least a subset of the particular data units;

wherein the one or more policies include a tail drop policy that is applicable when the queue delay measure for the particular queue exceeds a tail drop threshold;

wherein while the tail drop policy is applicable to the particular queue, discarding all data units assigned to the particular queue instead of enqueueing the data units in the particular queue;

forwarding at least some of the particular data units to other network devices via a plurality of communication interfaces of the network device.

11. The method of claim 10, wherein the one or more policies include a weighted-random early detection ("WRED") policy, the method further comprising:

selecting a particular frequency with which to discard data units assigned to the particular queue based on a WRED curve and the delay measure;

discarding first data units assigned to the particular queue instead of enqueuing the first data units in the particular queue, the first data units selected based on the particular frequency.

12. The method of claim 10, wherein the one or more policies include a congestion notification policy, the method further comprising:

selecting a particular frequency with which to mark data units assigned to the particular queue based on the delay measure;

when first data units are dequeued from the first queue, marking the first data units with a congestion notification, the first data units selected based on the particular frequency.

13. The method of claim 10, wherein the one or more policies include a reflection policy, the method further comprising:

selecting a particular frequency with which to reflect data units assigned to the particular queue based on the delay measure;

when first data units are enqueued to the particular queue, copying the first data units and sending the copies of the first data units back to a sender of the first data units with state information of the network device, the first data units selected based on the particular frequency.

14. The method of claim 10, further comprising:

calculating a congestion score based on a function of at least the delay measure and a size of the particular queue; and wherein determining the one or more policies to apply based on the delay measure is based on the congestion score.

15. One or more non-transitory computer-readable media storing instructions that, when executed by one or more computing devices, cause performance of:

receiving data units in a network device;

storing data units in one or more buffer memories while the data units await processing by packet-switching logic of the network device;

utilizing a plurality of queues to manage an order in which the buffered data units are processed by the packet-switching logic;

calculating a delay measure associated with at least a particular queue of the queues based on an arrival timestamp associated with at least a certain data unit in the particular queue, the delay measure for the particular queue is calculated by subtracting an arrival timestamp of a data unit at the head of the particular queue from a current time, the calculation occurring in response to one or more of:

dequeuing the data unit at the head of the particular queue, assigning a new data unit to the particular queue, or lapsing of a certain amount of time since the delay measure was last calculated;

determining one or more policies to apply to particular data units assigned to the particular queue based on the delay measure;

performing one or more actions indicated by the one or more policies on at least a subset of the particular data units;

wherein the one or more policies include a tail drop policy that is applicable when the queue delay measure for the particular queue exceeds a tail drop threshold;

wherein while the tail drop policy is applicable to the particular queue, discarding all data units assigned to the particular queue instead of enqueueing the data units in the particular queue;

forwarding at least some of the particular data units to other network devices via a plurality of communication interfaces of the network device.

16. The one or more non-transitory computer-readable media of claim 15, wherein the one or more policies include a weighted-random early detection ("WRED") policy, the method further comprising:

selecting a particular frequency with which to discard data units assigned to the particular queue based on a WRED curve and the delay measure;

discarding first data units assigned to the particular queue instead of enqueuing the first data units in the particular queue, the first data units selected based on the particular frequency.

17. The one or more non-transitory computer-readable media of claim 15, wherein the one or more policies include a congestion notification policy, the method further comprising:

selecting a particular frequency with which to mark data units assigned to the particular queue based on the delay measure;

when first data units are dequeued from the first queue, marking the first data units with a congestion notification, the first data units selected based on the particular frequency.

18. The one or more non-transitory computer-readable media of claim 15, wherein the one or more policies include a reflection policy, the method further comprising:

selecting a particular frequency with which to reflect data units assigned to the particular queue based on the delay measure;

when first data units are enqueued to the particular queue, copying the first data units and sending the copies of the first data units back to a sender of the first data units with state information of the network device, the first data units selected based on the particular frequency.

19. The one or more non-transitory computer-readable media of claim 15, further comprising:

calculating a congestion score based on a function of at least the delay measure and a size of the particular queue; and wherein determining the one or more policies to apply based on the delay measure is based on the congestion score.

* * * * *